United States Patent
Walma et al.

(10) Patent No.: US 10,009,099 B2
(45) Date of Patent: Jun. 26, 2018

(54) TECHNIQUES FOR COMMUNICATION WITH BODY-CARRIED DEVICES

(71) Applicant: INTEL CORPORATION, Santa Clara, CA (US)

(72) Inventors: Mathys C. Walma, Hillsboro, OR (US); Richard D. Roberts, Hillsboro, OR (US); Bradley A. Jackson, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 557 days.

(21) Appl. No.: 14/229,892

(22) Filed: Mar. 29, 2014

(65) Prior Publication Data

US 2015/0280818 A1   Oct. 1, 2015

(51) Int. Cl.
*H04B 10/00* (2013.01)
*H04B 10/116* (2013.01)
*H04B 10/114* (2013.01)

(52) U.S. Cl.
CPC ....... *H04B 10/116* (2013.01); *H04B 10/1149* (2013.01)

(58) Field of Classification Search
CPC .......................... H04B 10/1149; H04B 10/116
USPC .......................................... 398/115, 118–131
See application file for complete search history.

(56) References Cited

U.S. PATENT DOCUMENTS 6,978,023 B2 * 12/2005 Dacosta .............. H04L 63/0492
                                                                380/258
7,360,248 B1 * 4/2008 Kanevsky ............... G06F 21/31
                                                                726/21
7,559,081 B2 * 7/2009 Seidlein ................. G06Q 20/32
                                                                726/9
7,715,723 B2 * 5/2010 Kagawa ............. H04B 10/1141
                                                                398/127
9,191,108 B2 * 11/2015 Jiang .................... H04B 10/116
9,218,532 B2 * 12/2015 Roberts ............. G06K 9/00691
9,418,115 B2 * 8/2016 Ganick ............ G06F 17/30522
9,509,402 B2 * 11/2016 Ryan .................... H04B 10/116
9,608,733 B2 * 3/2017 Pavlas .................... H04B 10/40
9,813,150 B1 * 11/2017 Bitra .................... H04B 10/116
9,849,378 B2 * 12/2017 Poisner .................. A63F 13/25

(Continued)

FOREIGN PATENT DOCUMENTS

WO    WO 2014204753 A1 * 12/2014 ............. G01B 11/14

*Primary Examiner* — Amritbir Sandhu

(57) ABSTRACT

Various embodiments are directed to techniques for employing a camera to receive multiple light transmissions conveying at least identifying data from multiple body-carried devices to enable locations of those devices within a venue to be determined and transmissions to individual ones of those devices to be made. An apparatus to communicate via light transmissions includes an analysis component to analyze a set of consecutively captured frames of a portion of a venue to determine whether a light source present in at least a predetermined number of the consecutively captured frames is a light transmission from a body-carried device located within the portion of the venue, and to demodulate the light transmission to retrieve an identification (ID) data associated with the body-carried device from the light transmission; and a communications component to employ the ID data to wirelessly transmit a command to the body-carried device. Other embodiments are described and claimed.

19 Claims, 12 Drawing Sheets

(56) References Cited

U.S. PATENT DOCUMENTS

| | | | |
|---|---|---|---|
| 2008/0278324 A1* | 11/2008 | Uchimura | G01S 1/70 340/572.1 |
| 2009/0284366 A1* | 11/2009 | Haartsen | G01S 1/70 340/531 |
| 2009/0309987 A1* | 12/2009 | Kimura | G06T 3/4038 348/218.1 |
| 2012/0128255 A1* | 5/2012 | Aoyama | G06K 9/00228 382/195 |
| 2012/0249802 A1* | 10/2012 | Taylor | G06K 9/00771 348/169 |
| 2013/0028609 A1* | 1/2013 | Staats | G01S 1/70 398/130 |
| 2013/0058660 A1* | 3/2013 | Bae | G01C 21/00 398/130 |
| 2013/0064552 A1* | 3/2013 | Fortune | H04B 10/116 398/132 |
| 2013/0154558 A1* | 6/2013 | Lee | H04B 5/0037 320/108 |
| 2013/0163994 A1* | 6/2013 | Iizuka | H04B 10/116 398/130 |
| 2013/0271631 A1* | 10/2013 | Tatsuzawa | H04N 5/2353 348/296 |
| 2013/0271747 A1* | 10/2013 | Roberts | G01S 17/06 356/5.01 |
| 2013/0317916 A1* | 11/2013 | Gopalakrishnan | G06Q 30/0261 705/14.66 |
| 2013/0335302 A1* | 12/2013 | Crane | H04N 5/2354 345/8 |
| 2013/0337789 A1* | 12/2013 | Johnson | H04W 4/02 455/414.1 |
| 2014/0056172 A1* | 2/2014 | Lee | H04W 76/02 370/254 |
| 2014/0062334 A1* | 3/2014 | Nagazoe | H05B 33/0863 315/292 |
| 2014/0086587 A1* | 3/2014 | Roberts | H04B 10/116 398/115 |
| 2014/0093249 A1* | 4/2014 | Roberts | G01C 21/165 398/127 |
| 2014/0186026 A1* | 7/2014 | Oshima | H04B 10/116 398/25 |
| 2014/0200027 A1* | 7/2014 | Kim | G01S 1/70 455/456.1 |
| 2014/0207490 A1* | 7/2014 | Shindo | G06F 19/3462 705/3 |
| 2014/0270798 A1* | 9/2014 | Manahan | H04B 10/116 398/130 |
| 2014/0314420 A1* | 10/2014 | De Bruijn | H05B 37/0272 398/127 |
| 2015/0003832 A1* | 1/2015 | Yamasaki | H04B 10/116 398/115 |
| 2015/0022449 A1* | 1/2015 | Cheng | G06F 3/0346 345/163 |
| 2015/0147067 A1* | 5/2015 | Ryan | H04B 10/116 398/118 |
| 2015/0188629 A1* | 7/2015 | Oshima | H04B 10/116 398/118 |
| 2015/0269518 A1* | 9/2015 | Gray | G06Q 10/08 705/332 |
| 2015/0312696 A1* | 10/2015 | Ribbich | H04W 4/001 455/418 |
| 2015/0365173 A1* | 12/2015 | Yamasaki | H04B 10/1149 398/126 |
| 2015/0372753 A1* | 12/2015 | Jovicic | H04B 10/116 398/172 |
| 2015/0372754 A1* | 12/2015 | Choi | H04B 10/116 398/130 |
| 2015/0373503 A1* | 12/2015 | Jovicic | G01S 5/0252 455/456.1 |
| 2016/0197676 A1* | 7/2016 | Dong | G01S 11/12 398/172 |
| 2016/0292514 A1* | 10/2016 | Robinson | G06K 9/6202 |
| 2016/0344910 A1* | 11/2016 | Shen | H04N 5/2256 |
| 2016/0359561 A1* | 12/2016 | Baggen | H04B 10/116 |
| 2017/0347006 A1* | 11/2017 | Ryan | H04N 5/3532 |

* cited by examiner

TECHNIQUES FOR COMMUNICATION WITH BODY-CARRIED DEVICES

BACKGROUND

It has become commonplace to incorporate relatively low power devices into clothing articles and/or other products commonly carried and/or worn by persons, including radio frequency identification (RFID) tag devices incorporated into shirts, pants, shoes, hats, coats, bags, luggage, etc. Such devices typically employ near field radio frequency (RF) communications which uses relatively little electric power. However, such near field communications with such low power consumption supports only relatively low data rates over a relatively short range of mere inches. Further, RFID tag devices typically rely on the provision of reading devices generating an electromagnetic field to wireless provide electric power, and such electromagnetic fields also have a relatively short range of mere inches. However, the relatively short range of such provision of electric power and of such communications does enable the physical location of an RFID tag device within a venue to be known during use, since they must be within a relatively short distance of a reading device that may have a known location.

It has also become commonplace for individuals to carry and/or wear portable devices capable of wireless communications, including smart phones, laptop computers, tablet computers, smart glasses, smart watches, etc. Such devices typically employ RF wireless communications to form a wireless network enabling relatively high data rates. However, such wireless communications with such high data rates consume electric power at a relatively high rate and require the use of relatively complex access point devices providing a relatively sophisticated infrastructure in which various protocols are used to resolve collisions among devices and negotiate for available bandwidth for transmissions. Techniques have been devised to determine the physical location of such devices within a venue using such a network, but such techniques typically require coordinated triangulation among multiple access point devices.

DETAILED DESCRIPTION

Figure 1:
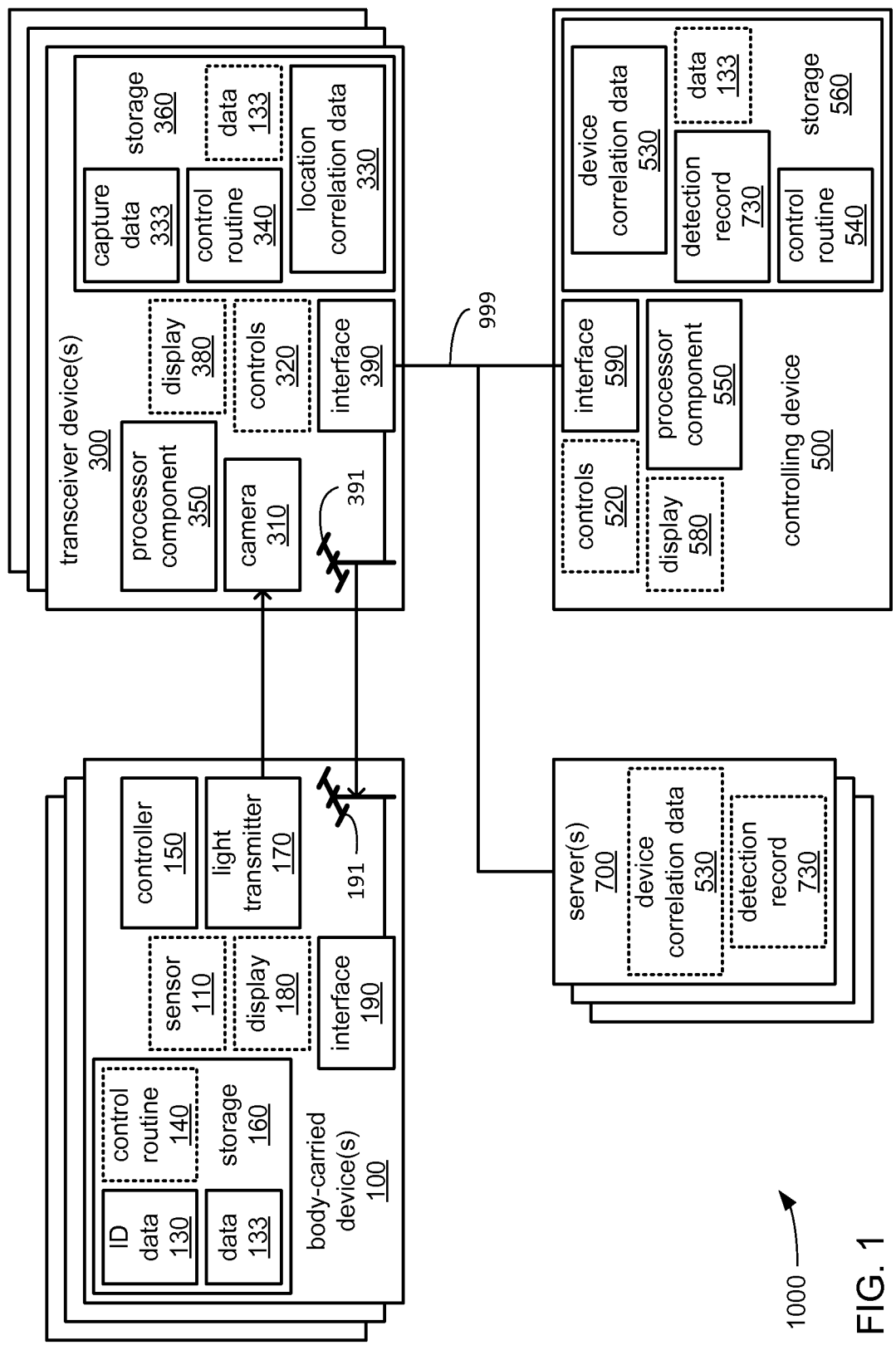
FIG. 1 illustrates an embodiment of a light communications system.

Various embodiments are generally directed to techniques for employing a camera to receive multiple light transmissions conveying at least identifying data from multiple body-carried devices to enable locations of those devices within a venue to be determined and transmissions to individual ones of those devices to be made. The light transmissions may employ any of a variety of wavelengths of light, including and not limited to, visible, infrared (IR) and/or ultraviolet (UV) light. The positions at which the body-carried devices are observed in the field of view of the camera may be correlated to physical positions of those devices within the venue at which the camera is positioned, thereby enabling the locations of the persons carrying those body-carried devices within the venue to be known. The identifying data provided in the light transmissions by each body-carried device may be used to distinguish one of the body-carried devices intended as the recipient of a wireless transmission from others, thereby enabling individual two-way communications therewith.

The venue may be an indoor or outdoor venue at which multiple people may be present such as the interior of an auditorium or stadium, an indoor worksite such as a warehouse, an outdoor worksite such as the site of a building under construction, or other outdoor site such as a portion of a battlefield. In some embodiments, multiple cameras with one or more overlapping fields of view may be employed to more effectively cover a relatively large venue.

Each of the body-carried devices may be a portable device carried by a person, including a device worn on a portion of that person's body. In some embodiments, one or more of the body-carried devices may be worn on a portion of a person's body in a manner akin to an accessory, such as a bracelet, pendant, armband, headband, wristwatch, glasses, etc. In other embodiments, one or more of the body-carried devices may be integrated into an article of clothing such as a hat, a glove, a vest, a jacket, a shirt, a shoe, etc. In still other embodiments, one or more of the body-carried devices may be a portable device carried by a person such as a smart phone, a tablet computer, laptop computer, etc.

At least one light emitting component, such as a light emitting diode (LED) or other component that emits light, of each of the multiple devices may be positioned on the body of a person in a manner meant to be more easily viewable by the camera as that person performs various activities within the field of view of the camera. The light emitting component may be of a type that is capable of outputting a modulated light at a modulation frequency high enough to avoid generating light that is perceived as flickering by the human visual system (HVS). To be clear, the wavelength of the light, itself, is not modulated. The at least one light emitting component is operated as a light transmitter where modulation of amplitude and/or modulation frequency of its light output are employed to implement frequency shift on/off keying (FSOOK) in transmitting at least the identifying data for detection by the camera. In some embodiments, the at least one light emitting component may also serve as a source of light for entertainment purposes, to provide information with its on or off status, as light for illumination, etc.

The camera is operated to recurringly capture images of at least a portion of the venue within its field of view in a manner very much like that of a video camera recording motion video imagery. In some embodiments, the frame rate at which images are captured by the camera may be similar to those typically encountered in the operation of typical video cameras (e.g., 24 frames per second to 120 frames per second). Sets of consecutively captured frames are analyzed to identify light emanating from light emitting components of one or more of the body-carried devices. Shape, size, color and/or other characteristics of the light emitted by each may be employed in distinguishing light emitting components of the body-carried devices from other sources of light, as well as duration, rate and/or pattern of modulation employed in making light transmissions.

Where analysis of sets of consecutively captured frames results in the detection of a light source that may be a light emitting component of a body-carried device making a light transmission, analysis to interpret that possible light transmission may be performed to determine whether various expected characteristics of a light transmission are present. By way of example, an analysis may be performed to determine whether there are bits at an expected bitrate making up an expected pattern of a header or other portion of a transmission, and/or whether there are bits at an expected bitrate making up an expected error checking code (e.g., a cyclic redundancy check, etc.) It should be noted that such analysis may be performed substantially concurrently (e.g., in parallel) for multiple light sources detected by the camera in consecutively captured frames.

As a result of covering at least a portion (if not all) of the venue with the field of view of the camera, the camera may capture light transmissions of light emitting components of numerous body-carried devices. Thus, the use of the camera to receive the light transmissions of multiple body-carried devices at various locations within its field of view coupled with analysis of sets of the frames effectively enables parallel reception of multiple light transmissions. Locations within the field of view of the camera may be correlated to physical locations of the venue, thereby enabling a physical location of a person associated with a particular body-carried device to be determined based on the location of the light emitting component of that person's body-carried device in the field of view.

The identifying data conveyed in the light transmissions may include unique identifiers associated with each of the body-carried devices and/or identifiers associated with the persons carrying the body-carried devices. Such unique identifiers may be employed in wireless transmissions directed to the body-carried devices to enable each to be separately communicated with. The wireless transmissions directed to individual ones of the multiple devices may be light and/or radio frequency transmissions. Such an ability to individually address each of the body-carried devices using their unique identifiers may be employed to serially select individual ones of the body-carried devices to transmit individually selected commands to (e.g., transmit to individual ones of the body-carried devices, one at a time), instead of more broadly transmitting the same command(s) to multiple ones of the body-carried devices. In other words, while the camera enables reception of light transmissions from multiple ones of the body-carried devices in parallel, the body-carried devices may be transmitted to serially, using the unique identifiers that each provided in their light transmissions received in parallel with the camera. Abilities to correlate individual ones of the body-carried devices to locations within the venue and/or to persons who may carry them may be employed in selecting one or more specific ones of the body-carried devices to transmit to.

One or more of the body-carried devices may incorporate a sensor to detect various characteristics of the venue and/or various characteristics of the persons that carry them. By way of example, one or more of the body-carried devices may incorporate a sensor to measure temperature, humidity, air pressure, sound level and/or other characteristics of the venue. Alternatively or additionally, one or more of the body-carried devices may incorporate a sensor to measure body temperature, perspiration level, heart rate, breathing, blood pressure, direction of movement, acceleration and/or other characteristics of the body on which it is carried. Such characteristics associated with the venue and/or person(s) may be included in light transmissions for detection by the camera along with identifying data.

Alternatively or additionally, one or more of the body-carried devices may incorporate a remotely operable component to perform a function in response to receipt of a wireless transmission conveying a command to perform that function. By way of example, one or more of the body-carried devices may incorporate a light-emitting component (which may or may not be the same light-emitting component employed in making light transmissions) able to be remotely operated to turn it on or off (in a manner visible to the HVS), change its visible color and/or blink visibly. Alternatively or additionally, one or more of the body-carried devices may incorporate a display enabling the presentation of text and/or images received remotely via wireless transmissions.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of a light communications system 1000 incorporating one or more of body-carried device(s) 100, one or more transceiver devices 300, a controlling device 500 and/or one or more servers 700. Each of the body-carried devices 100 may be carried by a person at a venue at which the transceiver device(s) 300 and/or the controlling device 500 are also located.

A light transmitter 170 of one of the body-carried devices 100 optically transmits at least identifying (ID) data 130 for capture by a camera 310 of one of the transceiver devices 300. The transceiver device 300 analyzes sets of consecutive frames captured by the camera 310 to determine whether a light transmission conveying the ID data 130 was captured, and if so, to retrieve the ID data 130 therefrom. The light transmissions are detected as light sources that each illuminate a region of pixels of the image sensor of the camera 310 in the field of view of the camera 310. The transceiver device 300 analyzes the location of the light sources determined to be light transmissions within the field of view of the camera 310 and correlates the location of each within the field of view to a location within the venue. If the ID data 130 is associated with a person (and not simply with the body-carried device 100), then the transceiver device 300 and/or the controlling device 500 may also correlate the ID data 130 received from that body-carried device 100 to a particular person.

The transceiver device 300 and/or the controlling device 500 may employ indications of what person is associated with a body-carried device 100 to select that body-carried device 100 as a recipient to which to make a wireless transmission. By way of example, there may be data and/or a command that is to be transmitted to the one of the body-carried devices 100 associated with a particular person. The transceiver device 300 and/or the controlling device 500 may analyze the ID data 130 received in light transmissions from body-carried devices 100 that are within the field of view of the camera 310 to determine whether or not that person is present in at least the portion of the venue within that field of view. If so, then the transceiver 300 may use the ID data 130 received in a light transmission from the body-carried device 100 associated with that person to make a wireless transmission to that body-carried device 100.

Alternatively or additionally, the transceiver device 300 and/or the controlling device 500 may employ indications of what location in the venue is associated with the position of a body-carried device 100 in the field of view of the camera 310 to select that body-carried device 100 as a recipient to which to make a wireless transmission. By way of example, a situation may arise concerning a portion of the venue that is within the field of view of the camera 310 that necessitates the transmission of an indication of that situation to any person within that portion of the venue. The transceiver device 300 and/or the controlling device 500 may analyze the ID data 130 received in light transmissions from any body-carried devices 100 that are detected by the camera within the portion of the field of view associated with that portion of the venue to identify the ones of the body-carried devices that are currently being carried by persons within that portion of the venue. The transceiver device 300 may use the ID data 130 received from those body-carried devices 100 to transmit the indication of that situation to those body-carried devices 100.

In some embodiments, each of the body-carried devices 100 may be registered with one or more of the servers 700 in a manner in which each is associated with a particular person or organization of people. As part of such registration, indications of a correlation between the ID data 130 and the particular person or organization of people may be stored in the one or more servers. Subsequently, one of the transceiver devices 300 and/or the controller 500 may retrieve such indications from the one or more servers 700 for use in correlating particular ones of the body-carried devices 100 to particular people. Depending on the purpose served by the body-carried devices 100 and the transceiver device(s) 300, the body-carried devices 100 and the transceiver device(s) 300 may subsequently exchange data that is shared by the one or more servers 700 through the controlling device 500.

As light transmissions conveying ID data 130 of different body-carried devices 100 are received by the camera 310, and as correlations are made to determine locations in the venue and/or identities of persons present in the venue, a record may be kept of each such received light transmission and the correlations made therefrom. Such a record may, at least initially, be stored within the transceiver device 300 and/or the controlling device 500 as it is added to with new indications of light transmissions received, etc. However, such a record may also be conveyed to one or more of the servers 700 for storage. It may be deemed desirable to be able to refer to such a record at a later time to determine the whereabouts and/or actions of a person for at least part of the time during which they may have been present within the venue.

The installation of one or more transceiver devices 300 and the controlling device 500 of the light communications system 1000 may take on any of a variety of different configurations operating under any of a variety of different circumstances. By way of example, for a relatively large venue, there may be numerous transceiver devices 300 positioned at various locations throughout the venue to cause at least a significant portion of the venue to be within the field of view of one or more cameras 310 of one or more of the transceiver devices 300. In such an installation, there may also be one or more of the controlling devices 500 installed therein to cooperate with the transceiver devices 300 to coordinate the reception and analysis of light transmissions from the body-carried devices 100 within that venue and/or to coordinate the directing of wireless transmissions to one or more specific body-carried devices 100.

Figure 2:
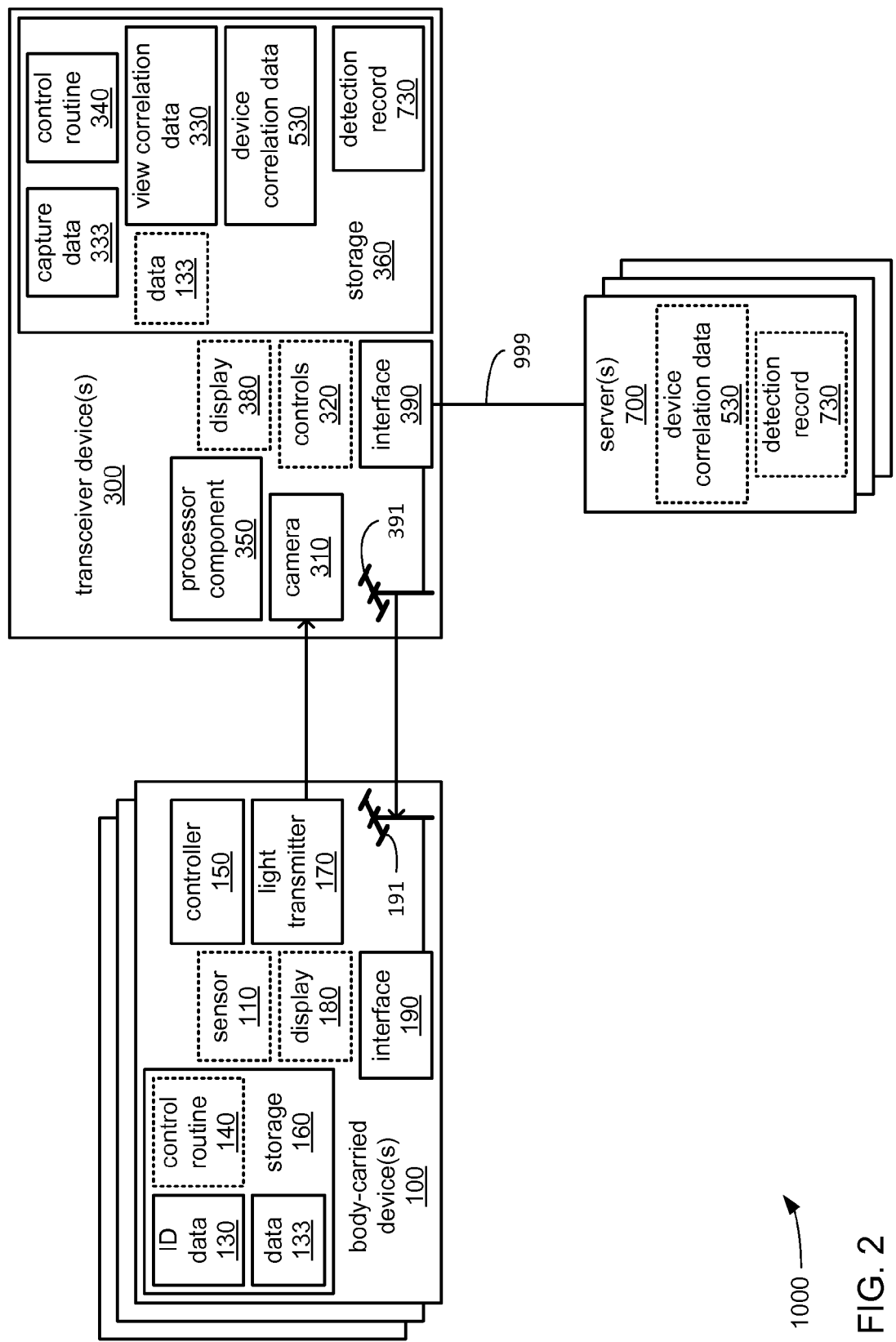
FIG. 2 illustrates an alternate embodiment of a light communications system.

FIG. 2 illustrates a block diagram of an alternate light communications system 1000. The light communications system 1000 of FIG. 2 is similar to the light communications system 1000 of FIG. 1 in numerous ways such that corresponding items are designated with corresponding reference numerals. The light communications system 1000 of FIG. 2 differs from that of FIG. 1 inasmuch as the light communications system 1000 of FIG. 2 incorporates only one transceiver device 300 and does not incorporate the controlling device 500.

In the light communications system 1000 of FIG. 2, the installation of the transceiver device 300 may take on any of a variety of different configurations operating under any of a variety of different circumstances. By way of example, for a relatively small venue, the transceiver device 300 may be positioned at a location in the venue to cause at least a significant portion (if not all) of the venue to be within the field of view of its camera 310. In such an installation, the transceiver device 300 may be the sole device receiving and analyzing light transmissions made by the body-carried devices 100 within that venue and/or directing wireless transmissions to one or more of those body-carried devices 100.

Referring to both FIGS. 1 and 2, more broadly, each of these devices 100, 300, 500 and 700 may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a smart card incorporating a processor component, a body-worn computing device incorporated into clothing, a computing device integrated into a vehicle (e.g., a car, a bicycle, a wheelchair, etc.), a server, a cluster of servers, a server farm, etc.

As depicted, these computing devices 100, 300, 500 and 700 exchange signals implementing and/or supporting optical communications. Among at least the computing devices 300, 500 and/or 700, such exchanges may occur through a network 999. However, one or more of these computing devices may exchange other data entirely unrelated to the use of optical communications with each other and/or with still other computing devices (not shown) via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, each one of the one or more body-carried devices 100 incorporates one or more of a controller 150, a storage 160, a sensor 110 and a display 180. Each of the body-carried devices 100 also incorporates one or both of the light transmitter 170 to make light transmissions to a transceiver device (e.g., the transceiver device 300), and an interface 190 accompanied by an antenna 191 to enable the body-carried device 100 to receive wireless transmissions from a transceiver device. The storage 160 stores one or more of a control routine 140, the ID data 130 and data 133. Again, the ID data 130 may include a unique identifier associated with the body-carried device 100, itself, and/or with a person who carries it. The data 133 may include a data payload to be transmitted by the body-carried device 100 along with the ID data 130 in a light transmission to a transceiver device.

The light transmitter 170 may be a light emitting component of any of a variety of types, including and not limited to a LED. As previously discussed, the amplitude and/or the modulation frequency with which light is emitted by the light transmitter 170 may be modulated to implement a form of FSOOK. Again, to be clear, the wavelength of the light, itself, is not modulated. In so doing, light is used to transmit at least the ID data 130 with a relatively low bitrate for capture by a camera (e.g., the camera 310) that may be operated to capture images at a typical capture rate for a video camera (e.g., 24 frames per second to 120 frames per second). The light transmitter 170 may employ any of a variety of wavelengths of light, including and not limited to, IR, UV and/or visible light.

However, as also previously discussed, in some embodiments, such a light emitting component, in addition to being employed to make light transmissions, may also be employed to provide light indicating device status, provide light for entertainment purposes (e.g., decorative lighting), provide light for illumination, etc. In such embodiments, the light emitting component of the light transmitter may be operated in either of an "on" state in which it is caused to at least appear steadily turned on to the HVS, or an "off" state in which it is caused to at least appear entirely turned off to the HVS. To be employed to make light transmissions while also appearing to be either steadily on or entirely off, particular amplitude modulations and/or modulation frequencies may be employed in modulating the light output by the light emitting component of the light transmitter 170 to implement FSOOK during each of the "on" and "off" states to maintain the intended appearances of those states to the HVS. Stated differently, frequencies and/or amplitudes by which to modulate a relatively small overall amount of the light emitted by the light emitting component of the light transmitter 170 during the "off" state may be selected to allow the light emitting component to appear to the HVS to remain steadily off such that it is not recognized by the HVS as outputting any light. Correspondingly, frequencies and/or amplitude by which to modulate the light output by the light emitting component of the light transmitter 170 during the "on" state may be selected to allow the light emitting component to appear to the HVS to be outputting a steady light such that it is not recognized by the HVS as outputting a modulated light.

The interface 190, in conjunction with the antenna 191, may incorporate any of a variety of RF receivers to receive RF transmissions from a transceiver device (e.g., the transceiver device 300). For purposes of minimizing power consumption, the interface 190 may not incorporate a RF transmitter or may not enable it. Instead, the light transmitter 170 may be employed for all transmissions made by the body-carried devices 100. In alternate embodiments of the body-carried devices 100, the antenna 191 may be replaced by a light receiving component (not shown) to receive light communications from a transceiver device that makes light transmissions to one or more of the body-carried devices 100, instead of RF transmissions.

In some embodiments, the controller 150 may incorporate a relatively simple sequencer, microcontroller or other logic implemented as digital circuitry to recurringly transmit the ID data 130 and/or the data 133 at a regular interval. In such embodiments, the data 133 may include one or more of personal information (e.g., name, address, etc.), account information (e.g., an account number or passcode), etc. Alternatively or additionally, the body-carried device 100 may incorporate a sensor 110 that recurringly measures a characteristic of the venue and/or of the body of the person carrying the body-carried device 100, and the data 133 may include indications of measures taken by the sensor 110. By way of example, the sensor 110 (if present) may measure temperature, humidity, air pressure, sound level and/or other characteristics of the venue, or may measure body temperature, perspiration level, heart rate, breathing, blood pressure, direction of movement, acceleration and/or other characteristics of the body on which the body-carried device 100 is carried.

In other embodiments, the controller 150 may incorporate a processor component capable of executing a sequence of instructions, such as the control routine 140. In such embodiments, the control routine 140 incorporates a sequence of instructions operative on the processor component of the controller 150 to implement logic to perform various functions. Among such functions may be to carry out various commands transmitted to the body-carried device 100. Such commands may include operating the display 180 to present text and/or other imagery to a person carrying the body-carried device 100. Alternatively or additionally, such commands may include operating one or more light emitting components to either be illuminated or not, and/or to be illuminated with one of a selection of colors of light. As has already been discussed, at least one of such a light emitting components may also serve as the light transmitter 170.

In various embodiments, each of the one or more transceiver devices 300 incorporates one or more of a processor component 350, a storage 360, the camera 310, controls 320, a display 380 and an interface 390 to couple the transceiver device 300 to the network 999. The interface 390 may be accompanied by an antenna 391 to also enable the transceiver device to make wireless RF transmissions to individual ones of the body-carried devices 100. The storage 360 stores one or more of a control routine 340, the data 133, location correlation data 330 and capture data 333. The location correlation data 330 may map locations within the field of view to locations within the venue. Depending on the function(s) served by the combination of the body-carried devices 100 and one or more transceiver devices 300, the data 133 may be received from one or more of the body-carried devices 100, and may be relayed to the controlling device 500 and/or one or more of the servers 700.

The camera 310 may be any of a variety of types of image capture device capable of recurringly capturing frames of whatever imagery is in its field of view (e.g., whatever portion of a venue is within its field of view) at steady rate, such as a rate typical of video cameras (e.g., 24 frames per second to 120 frames per second). The captured frames may be stored as the capture data 333 within the storage 360 to form a buffer of captured frames. The rate of capture of frames of images may be selected relative to the frequencies at which the light transmissions from the body-carried devices 100 are modulated to actually "subsample" the light of those light transmissions, leading to aliasing of the modulated light in the resulting frames. As familiar to those skilled in the art, it is a common practice in many applications to sample a modulated signal at a rate that is at least twice the highest frequency at which that signal is modulated (often referred to as the Nyquist frequency—sampling at a lower frequency is often referred to as subsampling).

The camera 310 may incorporate a charge-coupled device (CCD) element made up of a grid of light receptors to capture images. As familiar to those skilled in the art, various ones of such light receiving elements are capable of receiving light within any of a wide variety of ranges of wavelengths, including and not limited to, IR, UV and visible light. In the field of view of the camera 310, each light emitting component of one of the body-carried devices 100, when illuminated, may appear as a light source that illuminates a region of pixels of the image sensor of the camera 310.

The control routine 340 incorporates a sequence of instructions operative on the processor component 350 in its role as a main processor component of the transceiver device 300 to implement logic to perform various functions. In executing the control routine 340, the processor component 350 may analyze sets of frames consecutively captured by the camera 310 to identify light sources that appear to remain throughout a significant proportion of those frames. Of the light sources that do so remain throughout those frames, the processor component 350 may then analyze each to determine if the light of any of those light sources is modulated at one or more frequencies expected to be used in light transmissions from the body-carried devices 100. Of the light sources that are so modulated, the processor component 350 may then analyze each using a visual analysis to perform demodulation to attempt to retrieve and decode the contents of what may be transmitted. In so doing, the processor component 350 may determine whether each of those contents and/or the manner in which they are conveyed conforms to various expected characteristics, including and not limited to, an expected pattern for a header or other portion of the contents, an expected bitrate or an expected error correction coding. From the demodulated contents having the various expected characteristics, the processor component 350 may retrieve at least the ID data 130. The ID data 130 may include an identifier unique to each of the body-carried devices 100 such that the demodulated contents corresponding to light sources detected on the same captured frames should each include a different ID data 130 that is uniquely associated with a different one of the body-carried devices 100.

Again, such use of light transmissions by each of multiple body-carried devices 100 enables parallel reception of transmissions from numerous ones of the body-carried devices 100 without the complexities of typical RF wireless communications. By way of example, to accomplish the reception of multiple RF transmissions, collisions between the transmissions of multiple devices must be resolved with a protocol that entails greater complexity on the part of all devices to implement. Further, unless multiple RF channels are employed, which would still further increase complexity, parallel reception of multiple RF transmissions is not possible. Also, beyond the increased complexity, operating a RF transceiver of such complexity would result in far greater power consumption by each device. Thus, such use of light transmissions reduces the power consumption of at least each of the body-carried devices 100 to make transmissions, thereby enabling them to do so repeatedly for a longer period of time.

Figure 3:
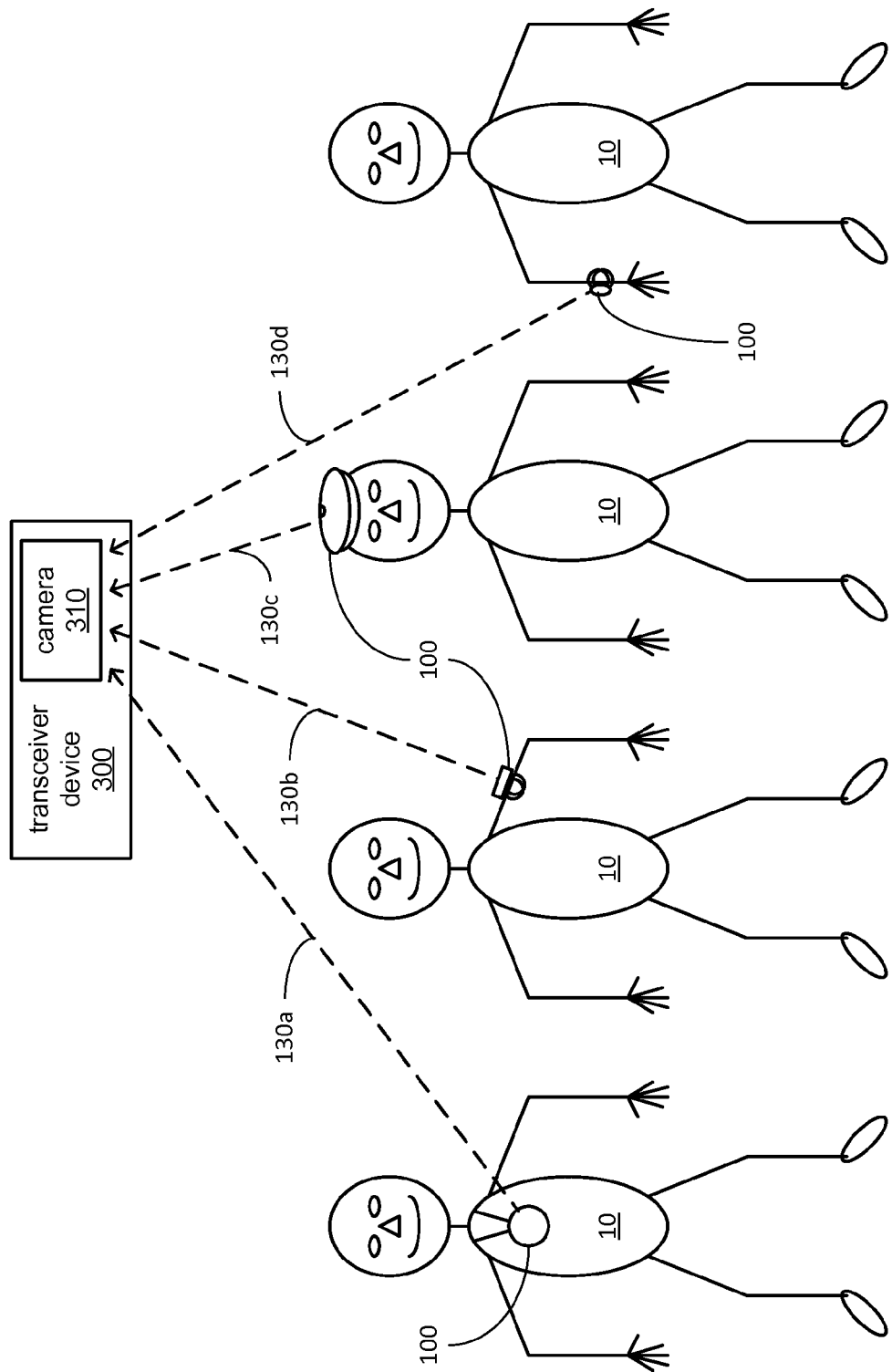
FIGS. 3 and 4, together, illustrate an embodiment of light communications.

FIG. 3 depicts an example such light transmissions from multiple ones of the body-carried devices 100, each conveying a different ID data 130a-d (each one of the ID data 130a-d is an incarnation of the ID data 130 of FIG. 1 or 2), to the same camera 310. As shown, each of the body-carried devices 100 may be of a different physical configuration, including a pendant worn about the neck of a person 10, an armband worn about an arm of another person 10, a hat worn atop the head of still another person 10, and a wristwatch worn about the wrist of yet another person 10. The different ones of the ID data 130a-d optically transmitted by each of the four depicted body-carried devices 100 enables the transceiver device 300 to select which of these four body-carried devices 100 to direct a wireless transmission to.

As recognizable to those skilled in the art, the unique identifying information of each of the ID data 130a-d may be used in any of a variety of ways to direct a wireless transmission to a specific one of the four depicted body-carried devices 100. By way of example, such identifying information may be incorporated into the contents of the wireless transmission (e.g., included in a header of a packet in a wireless transmission) to explicitly indicate which of the body-carried devices 100 the transmission is directed to. All of the body-carried devices 100 that receive the wireless transmission may examine the identifying information and each may use it to determine whether it is the intended recipient. The one body-carried device 100 that is the intended recipient may accept the contents of the transmission, while the others may simply discard the contents. By way of another example where each of the four depicted body-carried devices 100 monitor a different RF frequency or channel for wireless transmissions directed to each of them, the identifying information may indicate which RF frequency or channel to use to direct a wireless transmission to a specific one of the four depicted body-carried devices 100. By way of still another example, the identifying information may correlate to a selection of an encryption key or digital signature to use in wireless transmissions directed to a specific one of the four depicted body-carried devices 100. Regardless of the exact manner in which the ID data 130*a-d* is employed in directing the transmission of a command to an individual one of the four body-carried devices 100, the ability to do so may be utilized to individually, one at a time (e.g., serially), transmit particular commands to particular ones of the ID data 130*a-d*.

Figure 4:
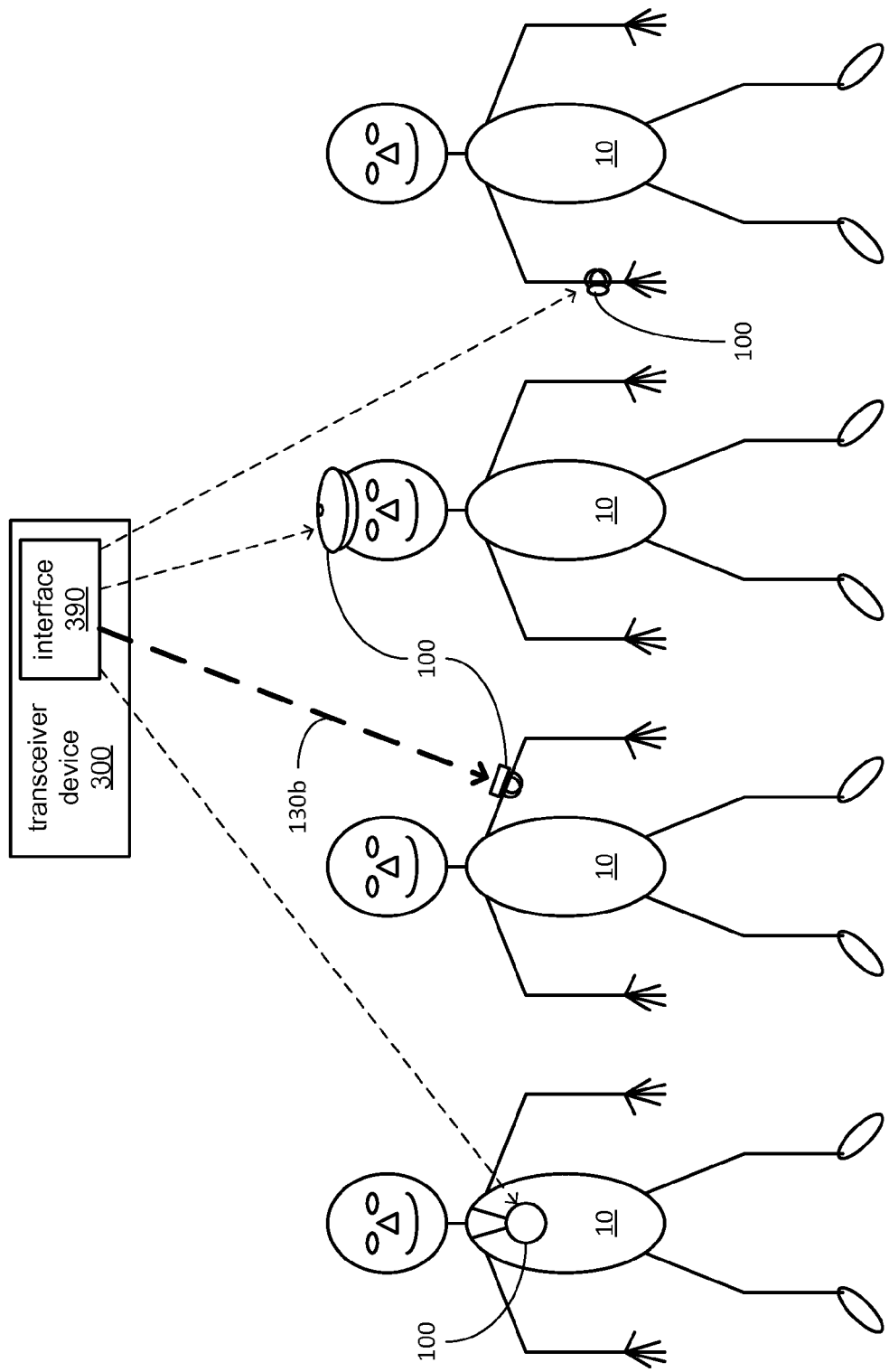

FIG. 4 depicts an example of such use of one of the ID data 130*a-d* transmitted in FIG. 3 in a light transmission to direct a wireless transmission to a particular one of the four depicted body-carried devices 100. Specifically, as depicted with a single bolded dashed line contrasting with three other non-bolded dashed lines, the processor component 350 employs the ID data 130*b* to direct a wireless transmission specifically towards the one of the four body-carried devices 100 that provided the ID data 130*b* in its light transmission detected by the camera 310.

Returning to FIGS. 1 and 2, in alternate embodiments of the transceiver device 300, the antenna 391 may be replaced by a light emitting component (not shown) to make transmissions using light communications to specific ones of the body-carried devices 100, instead of RF transmissions. In a manner that may be very much like the light transmissions made by the light emitting element(s) of the body-carried devices 100, such a light emitting element of the transceiver device 300 may be operated to transmit commands back to body-carried device(s) 100 in light transmissions employing modulated light. Thus, in such alternate embodiments, light transmissions may be employed bidirectionally in communications between the transceiver device 300 and the body-carried devices 100. In such alternate embodiments, such a light emitting component of the transceiver device 300 may have a somewhat directional pattern of dispersing light and may be "slaved" to the orientation of the camera 391 in the sense that the directional pattern of its light output and the field of view of the camera are optically aligned to overlap. Thus, where there is more than one camera 391 in an embodiment of the light communications system 1000, each such light emitting components of each of the transceivers 300 may be optically aligned with a corresponding camera 391 to direct light transmissions in a dispersion pattern that aligns with the field of view scanned by the corresponding camera 391. In still other embodiments, the transceiver device 300 may incorporate both the antenna 391 and such a light emitting component (again, not shown) enabling the choice of transmissions to the body-carried devices 100 by either RF transmission or light transmission to be made dynamically.

Upon identifying one or more captured light sources as light transmissions from one or more of the body-carried devices 100, the processor component 350 may employ the mapping of locations in the field of view of the camera 310 to locations in a venue indicated in the location correlation data 330 to correlate the locations of those transmitting body-carried devices 100 in the field of view (the ones associated with those light sources detected in the field of view) to locations in the venue. In so doing, the processor component 350 effectively determines the locations of the persons associated with those transmitting body-carried devices 100 within the venue.

Figure 5:
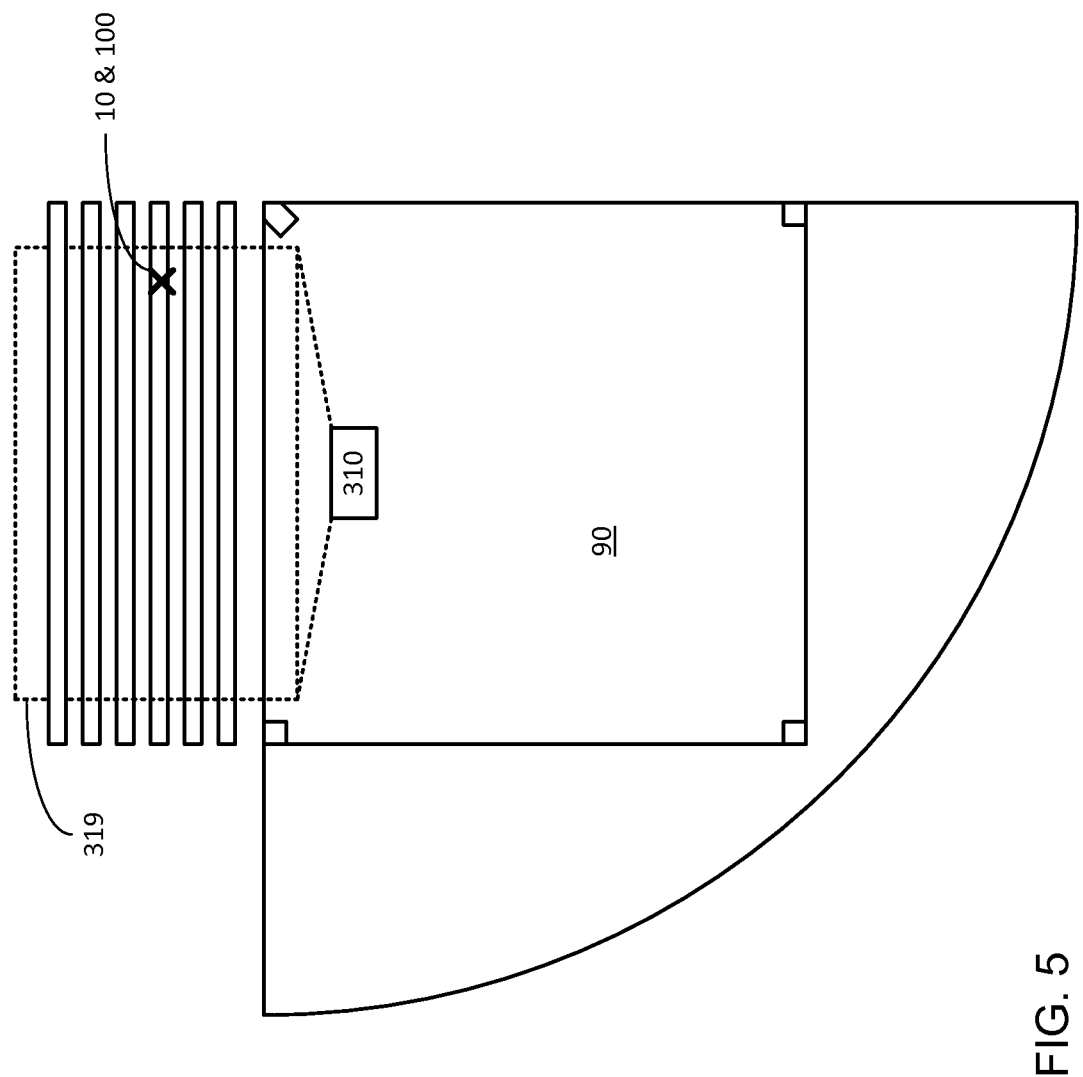
FIGS. 5 and 6 each illustrate an embodiment of monitoring for light communications.

FIG. 5 depicts an example of employing such correlation of locations within the field of view of a single camera 310 to locations within a venue 90. As depicted, the venue 90 is a baseball field. The camera 310, which may be physically mounted to the structure of an overhanging roof or a lighting tower, is positioned such that a significant portion of the bleachers at which an audience may sit is within its field of view 319. Upon receiving a light transmission from the body-carried device 100 of a person 10 sitting in the bleachers, the processor component 350 may employ the location correlation data 330 to determine the seat position of the person 10 in the bleachers from the location in the field of view 319 at which a light transmission from that person's body-carried device 100 appears as a light source. Thus, the unique identifier of the ID data 130 received in that light transmission from that body-carried device 100 becomes correlated to a specific location within the venue 90. This enables that body-carried device 100 to be selected by its location in the venue 90 to be the recipient of a wireless transmission directed specifically to it and/or to the person 10 carrying it.

In embodiments of the transceiver device 300 that include one or both of the manually operable controls 320 and the display 380, the processor component 350 may operate the controls 320 and/or the display 380 to provide a user interface (UI) by which an operator of the transceiver device 300 may configure the shape, size and/or other aspects of the field of view 319. Alternatively or additionally, such a UI may be provided to enable the generation of the location correlation data 330 by manual entry of a mapping of locations within the field of view 319 to locations within the venue 90 (e.g., the bleachers).

Returning to FIG. 1, in various embodiments, the controlling device 500 incorporates one or more of a processor component 550, a storage 560, controls 520, a display 580 and an interface 590 to couple the controlling device 500 to the network 999. The storage 560 stores one or more of a control routine 540, the data 133, device correlation data 530 and a detection record 730. The device correlation data 530 may map unique identifiers of the ID data 130 of each of the body-carried devices 100 to a person or organization of people. In embodiments in which the body-carried devices 100 are each registered with a particular person or organization of people (e.g., a corporation, a government department, a social organization, etc.), the controlling device 500 may receive the device correlation data 530 from one or more of the servers 700, which may serve as a repository for information concerning registrations of the body-carried devices 500. The detection record 730 may include indications of at least a subset of the light transmissions detected by one or more of the transceiver devices 300, along with correlations of those transmissions to locations within a venue derived from the location correlation data 330 and/or correlations of those transmissions to identifying information of particular persons derived from the device correlation data 530.

The control routine 540 incorporates a sequence of instructions operative on the processor component 550 in its role as a main processor component of the controlling device 500 to implement logic to perform various functions. In executing the control routine 540, the processor component 550 may operate the interface 590 to recurringly communicate with one or more of the transceiver devices 300 to receive indications therefrom of detected light transmissions. The processor component 550 may then store such indications as part of the detection record 730.

The processor component 550 may also coordinate the reception and analysis of light transmissions from the body-carried devices 100 within a venue and/or to coordinate the directing of wireless transmissions to one or more specific body-carried devices 100. More specifically, in a relatively large venue where multiple transceiver devices 300 are put in place along with the controlling device 500 as part of positioning a sufficient quantity of the cameras 310 to effectively capture images of at least the majority of the venue, there may be overlaps in the fields of view of two or more of the cameras 310. As a result, a light transmission of a single one of the body-carried device 100 may be detected as a light source in more than one of those fields of view. This may lead to multiple detection of the same light transmission and/or duplicate indications of where the person carrying that body-carried device 100 is located within the venue.

The processor component 550 may analyze indications of the locations of body-carried devices 100 received from each of the transceiver devices 300 based on the fields of view of their respective cameras 310, and may discard duplications as the processor component 550 stores indications of locations of body-carried devices 100 as part of the detection record 730. Alternatively or additionally, the processor component 550 may analyze light transmissions that are received from body-carried devices 100 through more than one transceiver device 300 to determine which of those transceiver devices 300 appears to have a better viewing angle to more reliably receive the light transmissions. The processor component 550 may then discard indications of light transmissions received through one field of view that does not have as reliable a viewing angle as another field of view.

Figure 6:
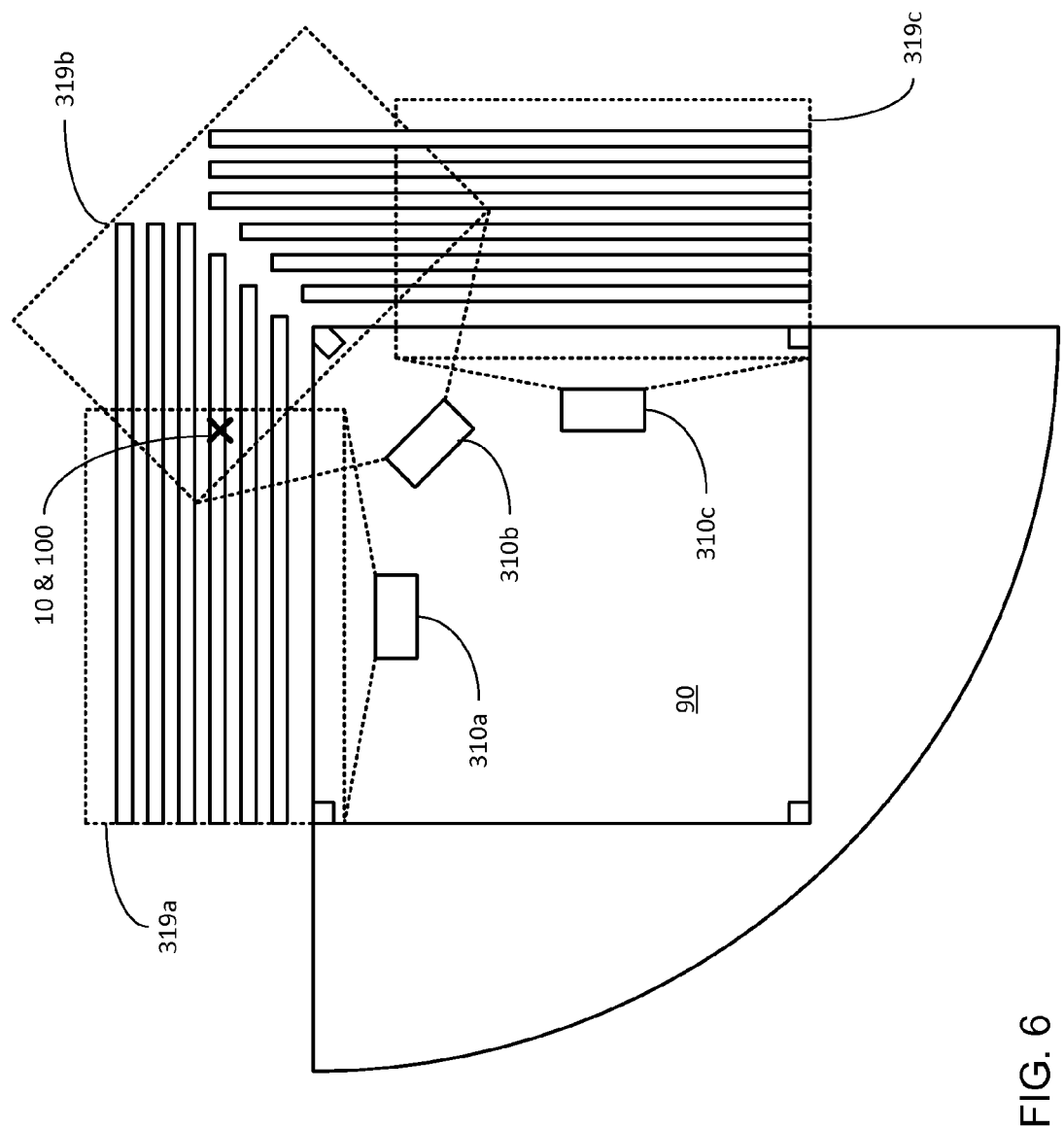

FIG. 6 depicts an example of overlap among three fields of view of 319a-c of three cameras 310a-c (each of the cameras 310a-c is an incarnation of the camera 310 of FIGS. 1 and 2) in an alternate form of the baseball field venue 90 introduced in FIG. 5. As depicted, this form of the venue 90 includes a larger set of bleachers that now extend along two sides of the baseball diamond. As also depicted, to cover this larger set of bleachers effectively, the three cameras 310a-c have been positioned such that their fields of view 319a-c, together, cover substantially all of the larger set of bleachers. However, there is overlap between the fields of view 319a and 319b, and between the fields of view 319b and 319c. Further, a person 10 is located in the bleachers amidst the overlap between the fields of view 319a and 319b. As a result, light transmissions made by a body-carried device 100 carried by the person 10 may be detected by both of the cameras 310a and 310b, resulting in duplicate indications of having detected that body-carried device 100 being provided to the controlling device 500 from the two transceiver devices 300 to which the cameras 310a and 310b belong.

Returning to FIG. 1, the processor component 550 may also analyze indications of the locations of body-carried devices 100 received from each of the transceiver devices 300 based on the fields of view of their respective cameras 310, and may resolve instances of movement of a body-carried device 100 out of one field of view of one camera 310 and into another field of view of another camera 310. For example, the processor component 550 may discard indications of a particular body-carried device 100 being located within one field of view once it is subsequently detected for the first time in another field of view. In the detection record 730, the processor component 550 may include indications of instances where a particular body-carried device 100 ceased to be detected in one field of view and was detected in another.

Turning more specifically to FIG. 2 in which the embodiment of the light communications system 1000 thereof is depicted as not including the controlling device 500, it may be that the transceiver device 300 performs at least some of the functions just described as performed by the controlling device 500 of the embodiment of the light communications system 1000 of FIG. 1. More specifically, the storage 360 of the transceiver device 300 in FIG. 2 may also store the device correlation data 530 and/or the detection record 730. Accordingly, the processor component 350 of the transceiver device 300 of FIG. 2 may employ the device correlation data 530 to correlate unique identifiers for ID data 130 received from body-carried devices 100 to identities of persons and/or organizations of people. Alternatively or additionally, the processor component 350 of the transceiver device 300 of FIG. 2 may generate the detection record 730.

It should be noted that although each of the transceiver devices 300 depicted and described herein have been portrayed as incorporating (or being otherwise coupled to) only one camera 310, other embodiments are possible in which a single transceiver device 300 incorporates or is otherwise coupled to more than one camera 310. In such embodiments, the processor component 350 may resolve instances of duplicated detection of a body-carried device 100 where the fields of view of two or more of its cameras 310 overlap.

More broadly, embodiments of the light communications system 1000 incorporating differing combinations of the body-carried devices 100, the transceiver device(s) 300, the controlling device 500 and/or the server(s) 700 may be employed in a wide variety of venues for a wide variety of purposes. By way of example, an embodiment of the light communications system 1000 may be installed at a job site venue, such as a construction site, an excavation site, a hazardous waste cleanup site, etc. to monitor the presence and locations of personnel. Each person at the job site may wear or otherwise carry one of the body-carried devices 100. For instance, the body-carried devices 100 may be integrated into the hard hats that they wear. At least one camera 310 of at least one transceiver device 300 may be mounted on a pole or other structure overlooking the job site to detect light transmissions made by the body-carried devices 100.

As the light transmissions are recurringly received by the camera 310 and decoded by the processor component 350 of the transceiver device 300, the locations at which the light transmissions appear as light sources in the field of view of the camera are correlated with locations on the job site to recurringly determine and track the location of each worker on the job site. Further, each of the body-carried devices 100 may be registered with a particular one of the workers such that the ID data 130 received in each light transmission may be correlated to a particular person such that it is possible to determine who is at each of the locations of the job site at which a person is detected as present. Indications of who is where may be recorded at intervals as part of the detection record 730 generated either by the transceiver device 300 or a controlling device 500. The detection record 730 may be stored by a server 700 for future use if a need should arise to determine who was where at the job site when a particular event occurred. For example, following a collapse of a structure, a rock face, etc. that may have buried one or more persons, the detection record 730 may be used to determine who was in the area of the collapse when it happened so as to determine how many people may need to be searched for and who they are.

Further, each of the body-carried devices 100 may incorporate the sensor 110, and the sensor 110 may be any of a variety of hazard detector such as a hazardous gas detector, a sound pressure level detector, etc. Each of the body-carried devices 100 may recurringly measure a level of a potentially hazardous condition, such as the parts per million of a hazardous gas that may be present at the job site or a decibel level of sound generated by machinery used at the job site. The light transmissions from one or more of the body-carried devices 100 may convey the data 133 which may include indications of measurements by the sensor 110 showing a developing hazardous condition (e.g., too high a level of a hazardous gas or too high a sound level). The correlation of body-carried devices 100 (as identified through their transmitted ID data 130) to locations within the job site may be employed to select ones of the body-carried devices 100 that are in the vicinity of the developing hazard to transmit an indication of a warning to. Thus, the locations in the job site venue with which each of the body-carried devices 100 has been associated by correlation with locations in the field of view are used to select which ones of the body-carried devices 100 to transmit a specific command to. The transmitted indication of a warning may include a command to operate the display 180 of those body-carried devices 100 to present warning text and/or graphics to the workers carrying those body-carried devices 100.

By way of another example, another embodiment of the light communications system 1000 may be installed at an auditorium or stadium venue, such as a location at which concerts, rallies, sports events, etc. take place, to enable a more interactive experience for the attendees. Each person attending an event at that venue may wear or otherwise carry one of the body-carried devices 100. For instance, the body-carried devices 100 may be integrated into headbands, wristbands, armbands, pendants, etc. provided to attendees as they arrive. At least one camera 310 of at least one transceiver device 300 may be mounted at high vantage point overlooking the audience area, such as a pole, a wall, a portion of a ceiling, etc., to detect light transmissions made by the body-carried devices 100.

As the light transmissions are recurringly received by the camera 310 and decoded by the processor component 350 of the transceiver device 300, the locations at which the light transmissions of each body-carried device 100 appear as light sources in the field of view of the camera 310 are correlated with locations within the audience area to recurringly determine and track the locations of audience members. Indications of how many people are located in which portions of the audience area may be monitored to determine if overcrowding is occurring at a portion of the audience area to better enable crowd control to preserve safety. More cameras 310 may be similarly positioned at other locations within the venue, such as at exits, in corridors, etc. to also better enable crowd control to preserve safety.

At least a subset of the body-carried devices 100 may incorporate the sensor 110, and the sensor may be any of a variety of measuring device measuring one or more characteristics of the environment within the venue, such as temperature, humidity, sound level, etc. Indications of measurements taken by such embodiments of the sensor 110 may be conveyed as the data 133 in light transmissions for detection by the camera(s) 310 along with the ID data 130. The processor component 350 of the transceiver device 300 may correlate the locations at which those light transmissions appear as light sources in the field(s) of view to locations of the venue to determine where a temperature, humidity or noise level reading included in such received data 133 was taken within the venue. The processor component 300 may provide indications of such readings and their locations within the venue to another device (e.g., one of the server 700) to use as input to operating a climate control system of the venue and/or operating amplifiers driving speakers located within the venue. Thus, such readings may be employed to maintain comfort and/or adjust the level of amplified audio in different portions of the venue.

Alternatively or additionally, the body-carried devices 100 may incorporate a form of the sensor 110 that enables monitor audience responses to the event taking place in the forum. For instance, if a concert is being performed, the sensor 110 may include an accelerometer to monitor audience movement in response to the music played. If light transmissions from numerous ones of the body-carried devices 100 convey data 133 that includes indications of movement by a large proportion of the audience in time with the music, then this may provide an indication that the audience is enjoying the performance. Measures of degree of movement during a sports event may indicate the degree to which the audience is enjoying the play action. For instance, indications in the data 133 of periods of many audience members jumping up, clapping, waving their arms in the air, etc., as opposed to simply sitting or standing still, may be deemed to be indications of enjoying the play action.

In embodiments in which the sensor 110 includes a sound pressure sensor and/or an accelerometer, the body-carried devices 100 may enable measurement of audience feedback on occasions where audience members are asked to "vote" on something to do with the event taking place at the venue. For instance, if the audience is asked to vote for a best team, a choice of song, a best contestant, etc., measurements of sound pressure from cheering and/or of accelerations caused by clapping or waving hands in the air may be received as in the data 133 conveyed in the light transmissions from the body-carried devices 100 and compared to determine the outcome of the vote. Still further, where different portions of the audience (e.g., audience members in different sections of the audience area) are asked to "compete" by cheering, etc., measures of sound pressure levels and/or movement consistent with waving or jumping as part of cheering may be taken and compared to determine which portion of the audience "won" the competition.

In still other embodiments, at least a subset of the body-carried devices 100 may incorporate one or more components that are remotely controllable to also turn audience members into participants in the event occurring at the venue. For instance, at least a subset of the body-carried devices 100 may incorporate one or more light emitting components (which may or may not include the light emitting component employed as the light transmitter 170) that are remotely operable to be illuminated at different brightness levels and/or with different colors. In such embodiments, such body-carried devices 100 may be shirts, vests, coats, hats, gloves, etc. into which such light emitting components may be sewn or otherwise integrated. Correlations made between where light transmissions from each of the body-carried devices 100 appear in the field of view and their locations within the venue may be employed to actually treat each of the body-carried devices 100 as a "pixel" in a large illuminated visual presentation of a team logo or other image that is made up of numerous ones of the body-carried devices 100 worn or otherwise carried by audience members. More precisely, wireless transmissions directed to particular ones of the body-carried devices 100 (using the ID data 130 provided by each in light transmissions) may convey commands to turn on one or more light emitting components with a specified light level and/or color to become a pixel of such a visual presentation. The relative positions of each of those body-carried devices 100 in the audience area may be used to determine what light level and/or what color each is to be remotely commanded to use. In embodiments in which a contest between audience members has resulted in a portion of the audience "winning," the body-carried devices 100 of those "winning" audience members may be remotely commanded to illuminate in some manner that distinguishes those audience members from others.

Figure 7:
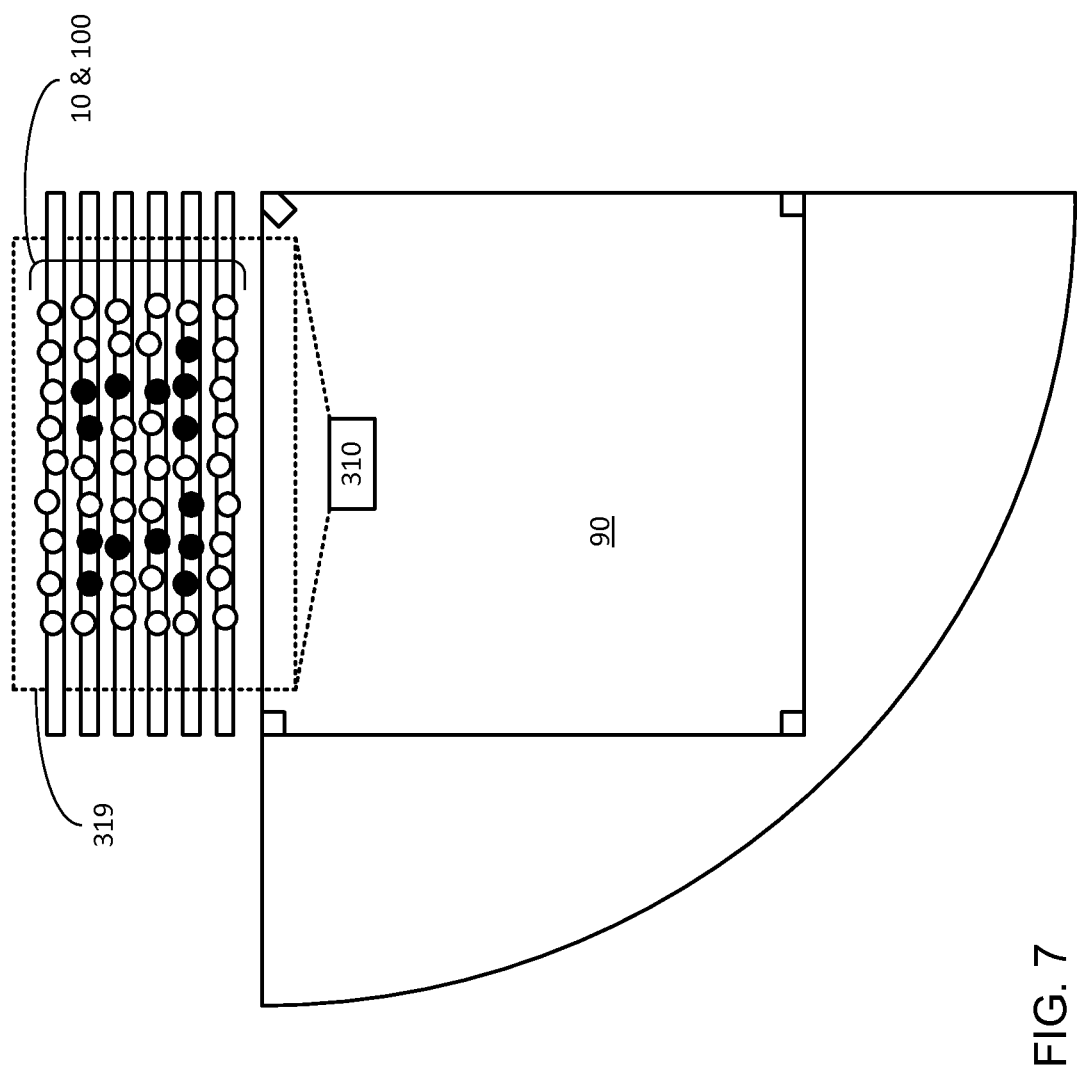
FIG. 7 illustrate an embodiment of use of light communications in a visual presentation.

FIG. 7 depicts an example of such use of multiple body-carried devices 100 as "pixels" in a large visual display in the baseball field venue 90 introduced in FIG. 5. As depicted, multiple people 10, each wearing (or otherwise carrying) a body-carried device 100, are located in the bleachers. As also depicted, the body-carried device 100 worn or carried by each person 10 has received a command to operate a light emitting component thereof to illuminate with one of two colors to create a visual display of a number "11" thereamong. Again, relative positions of the body-carried devices 100 (and accordingly, of the people 10 carrying them) in the bleachers may be determined by correlating the locations at which their light transmissions appear as light sources in the field of view of the camera 310 to those positions in the bleachers. With the relative positions in the bleachers known, different ones of the body-carried devices 100 may be selected to be commanded to provide one color of illumination or the other to create a pattern of illuminated colors among those body-carried devices 100 that generates the visual display of the number "11". Thus, the locations in the bleachers of the baseball field venue 90 with which each of the body-carried devices 100 has been associated by correlation with locations in the field of view 319 of the camera 310 are used to select which ones of the body-carried devices 100 to transmit a specific command to. Again, to effect the transmission of commands to provide one color of illumination or another to the correct ones of the body-carried devices 100 used in this visual display, separate transmissions (light or RF transmissions) are made to separates ones of those body-carried devices, one at a time (e.g., serially addressed) using the ID data 130 received from each.

Returning to FIGS. 1 and 2, in still other embodiments in which each of the body-carried devices 100 is in some way registered with individual persons, the whereabouts of a missing person or a participant in a criminal act may be determined by referring to the detection record 730 in which indications of correlations of ID data 130 to particular persons and correlations to locations within the venue may provide an indication of where that person was throughout the performance or is currently. Alternatively or additionally, registration of the body-carried devices 100 to individual persons may also enable a text message or other communication to be transmitted to a particular body-carried device 100 associated with a particular person for display on the display 180 in an embodiment of the body-carried device 100 that incorporates the display 180. In preparation to convey such communications to that particular body-carried device 100, either the processor component 350 of the transceiver device 300 or the processor component 550 of the controlling device 500 may first determine whether that particular body-carried device 100 is currently detected as present in the venue based on whether a light transmission conveying its ID data 130 has recently been received, or not. If so, then a wireless transmission is made to that particular body-carried device 100, using the unique identifying information of the ID data 130 to direct the wireless transmission exclusively to it, to convey a command to provide such communications to the person with which that particular body-carried device 100 is associated (and who is presumably currently wearing or otherwise carrying it). Thus, the identity of a person with which a particular body-carried device 100 has been associated by correlation between identifying information of that body-carried device 100 and that person is used to determine whether to wirelessly transmit a command to that particular body-carried device 100.

In various embodiments, each of the processor components 350 and 550, and/or the controller 150 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, each of the storages 160, 360 and 560 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, at least a portion of each of the interfaces 190, 390, 590 and 790 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 8:
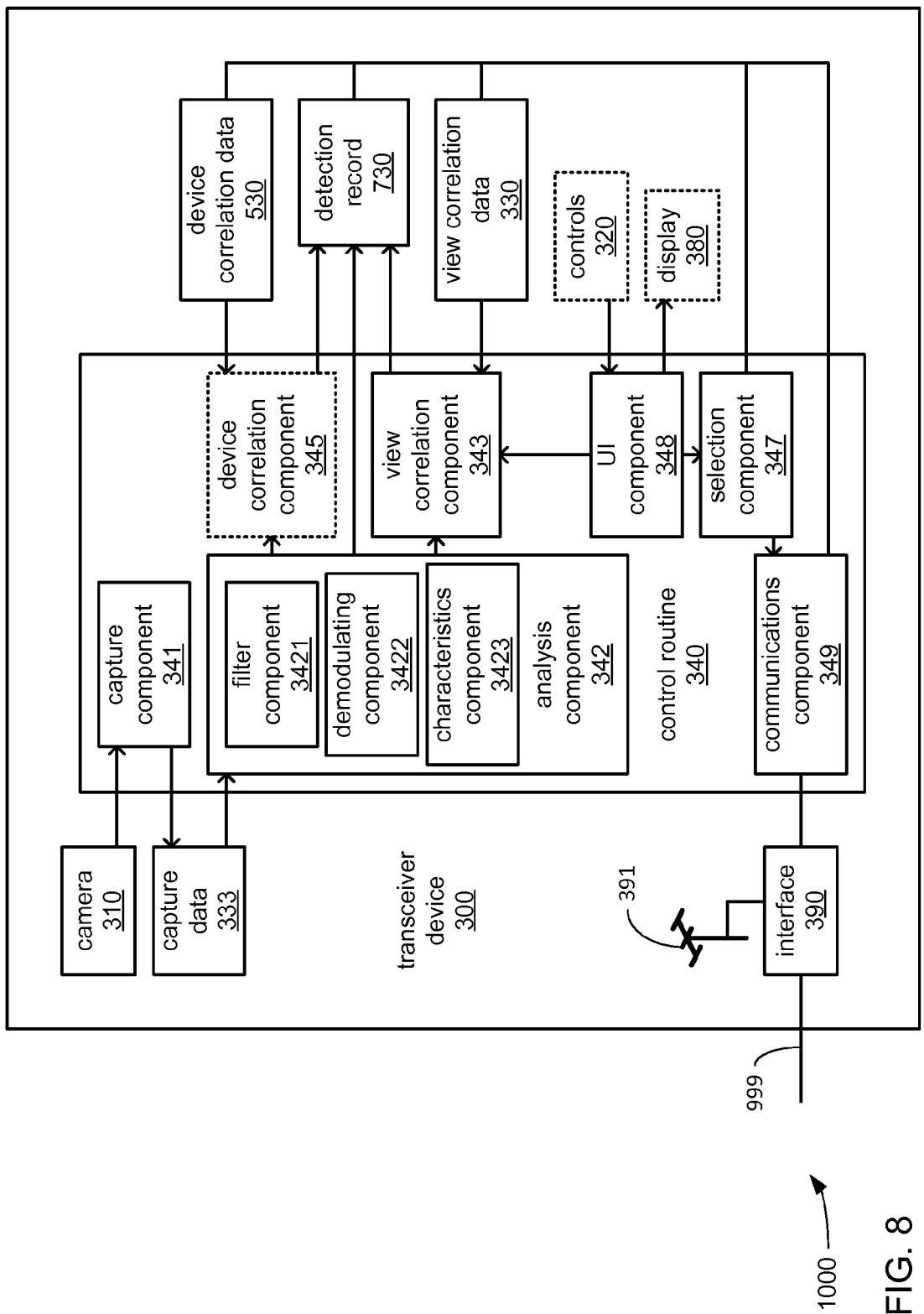
FIG. 8 illustrates a portion of an embodiment.

FIG. 8 illustrates a block diagram of a portion of an embodiment of the light communications system 1000 of either FIG. 1 or FIG. 2 in greater detail. More specifically, FIG. 8 depicts aspects of the operating environment of the transceiver device 300 in which the processor component 350 receives light transmissions from and makes wireless transmissions to one or more body-carried devices. As recognizable to those skilled in the art, the control routine 340, including the components of which it is composed, are selected to be operative on whatever type of processor or processors that are selected to implement the processor component 350.

In various embodiments, the control routine 340 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processor component 350. Where one or more device drivers are included, those device drivers may provide support for any of a variety of other components, whether hardware or software components, of the transceiver device 300.

The control routine 340 may include a communications component 349 executable by the processor component 350 to operate the interface 390 to transmit and receive signals via the network 999 as has been described. Among the signals transmitted and/or received may be signals conveying the data 133 to the controlling device 500 and/or the detection record 730 to one of the servers 700 via the network 999. Alternatively or additionally, among the signals transmitted and/or received may be signals conveying the view correlation data 330 and/or the device correlation data 550 to the transceiver device 300. As will be recognized by those skilled in the art, the communications component 349 is selected to be operable with whatever type of interface technology is selected to implement the interface 390.

The control routine 340 may include a capture component 341 executable by the processor component 350 to operate the camera 310 to recurringly capture frames of images of the portion of a venue that is in the field of view of the camera 310, and buffer the captured frames as capture data 333. As previously discussed, the rate of frame capture may be among the range of frame rates typically employed by video cameras.

The control routine 340 may include an analysis component 342 executable by the processor component 350 to employ various forms of analysis on sets of the frames consecutively captured by the camera 310 (and stored as the capture data 333) to identify light transmissions of one or more body-carried devices (e.g., one or more of the body-carried devices 100). As depicted, the analysis component 342 may include a filter component 3421 to limit the light sources detected in sets of consecutively captured frames to those appearing throughout a number of consecutive captured frames consistent with such a light transmission. The analysis component 342 may include a demodulating component 3422 to determine if one or more of the light sources detected in sets of consecutively captured frames is modulated at one or more frequencies expected in such a light transmission. The analysis component 342 may include a characteristics component 3423 to determine if the contents of a demodulated possible light transmission includes an expected pattern of bits (e.g., an expected pattern in a header), has an expected bitrate and/or includes an expected error check coding (e.g., cyclic redundancy check or some other expected form of error check coding).

The control routine 340 may include a device correlation component 345 executable by the processor component 350 to correlate each body-carried device 100 to a person or organization of people by using the device correlation data 530 to correlate ID data 130 received from each body-carried device 100 in light transmissions therefrom to identifying information for particular persons. As previously discussed, each of the body-carried devices 100 may be registered with a person or organization of people in a process resulting in the creation of the correlation data 530 providing a mapping therebetween, and which may be received from a server 700 that stores such information.

The control routine 340 may include a view correlation component 343 executable by the processor component 350 to correlate the locations in the field of view of the camera 310 at which light transmissions from each body-carried device 100 are each detected as light sources to locations of each body-carried device 100 in the venue through the mapping therebetween provided in the view correlation data 330. As previously explained, the view correlation data 330 may be created by personnel effecting installation of the transceiver device 300 and/or other components of a light communications system 1000.

One or more of the analysis component 342, the device correlation component 345 and the view correlation component 343 may store indications of having detected body-carried devices 100 as part of the detection record 730 and/or indications of correlations of body-carried devices to locations in the venue and/or to particular persons. At least in embodiments in which the transceiver device includes or is otherwise coupled to more than one camera 310, the correlation component 343 may remove duplicates of such indications of detection and/or correlation from the detection record 730 and/or may prevent the storage of such duplicate indications therein.

The control routine 340 may include a user interface (UI) component 348 executable by the processor component 350 to operate the controls 320 and/or the display 380 to provide a user interface enabling manual operation of the transceiver device 300 to perform various functions. Among such functions may be to operate the controls 320 and/or the display 380 to enable manual input of the mapping between locations in the field of view of the camera and locations within the venue and thereby generate the view correlation data 330. The controls 320 may be any of a variety of types of manually operable controls (e.g., a keypad, switches, touch-sensitive surface, voice input component, etc.), and the display 380 may be any of a variety of types of display, including a touchscreen that integrates the controls 320 as a touch-sensitive input element.

The control routine 340 may include a selection component 347 executable by the processor component 350 to employ either location in the venue or identity of a person to select one or more body-carried devices 100 to direct wireless transmissions to. As previously discussed, such wireless transmissions may convey a command to remotely control one or more aspects of body-carried devices 100, including illumination of a light emitting component or presentation of a message. Where the selection of a body-carried device 100 is based on the identity of a person correlated therewith, the choice of person may be provided to the selection component 347 via manual operation of the transceiver device 300 enabled by the UI component 348. Where the selection of body-carried devices 100 is based on the location of persons within the venue, the choice of command to send to whatever ones of the body-carried devices 100 are currently carried by persons located at a particular location within the venue may be determined automatically based on detection of a condition arising at that location, such as the arising of a hazardous condition, etc. The selection component 347 may be provided with script data (not shown) indicating various commands to be automatically wirelessly transmitted in response to various situations that may arise.

In support of such wireless transmission of commands to selected ones of the body-carried devices 100, the communications component 349 may be alternately or additionally executable by the processor component 350 to operate the interface 390 to direct such wireless transmissions to selected ones of the body-carried devices 100. As previously discussed, such wireless transmissions may be so directed by using the identifying information of the ID data 130 for a particular body-carried device 100 as an identifier included in the wireless transmission, to select a RF channel for the wireless transmission, to encrypt or digitally sign the contents of the wireless transmission, etc.

Figure 9:
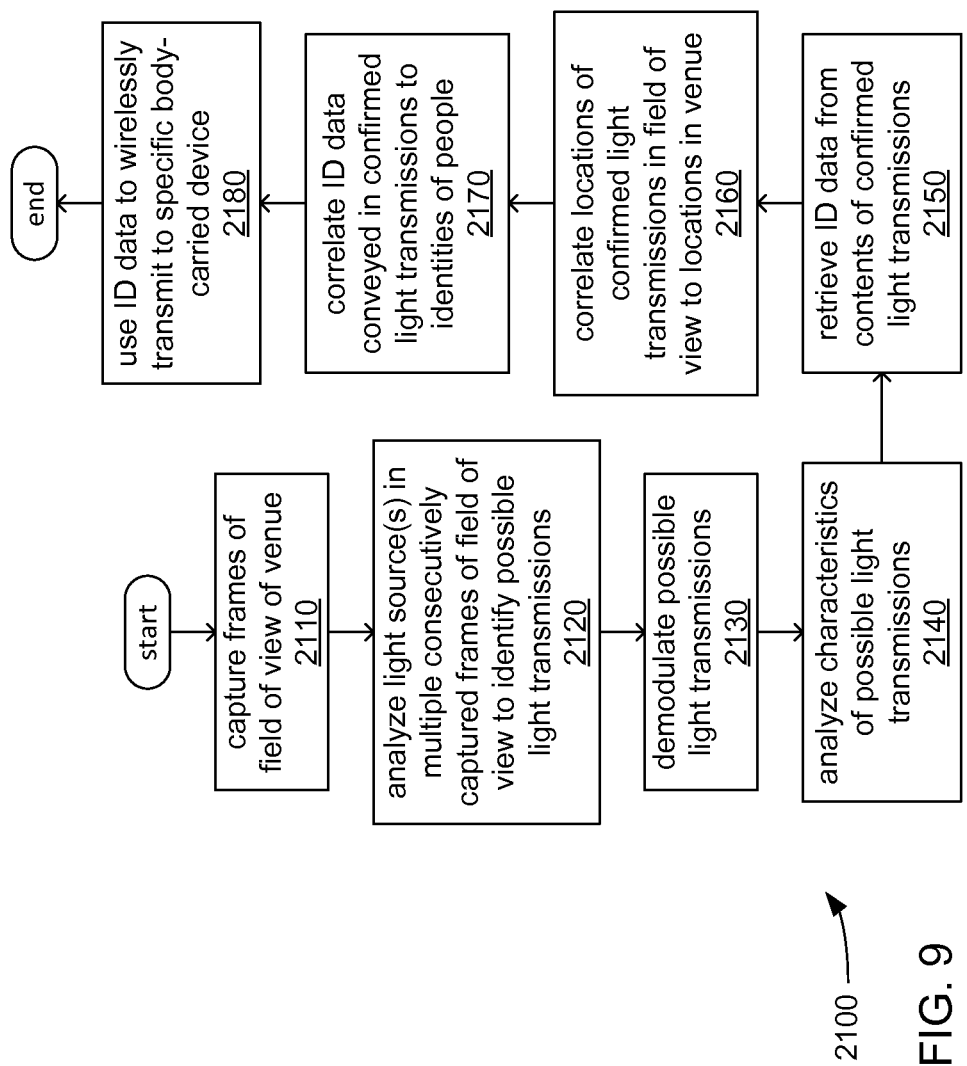
FIGS. 9-11 each illustrate a logic flow according to an embodiment.

FIG. 9 illustrates an embodiment of a logic flow 2100. The logic flow 2100 may be representative of some or all of the operations executed by one or more embodiments described herein. More specifically, the logic flow 2100 may illustrate operations performed by at least the processor component 350 in executing at least the control routine 340, and/or performed by other component(s) of at least one of the transceiver devices 300. In particular, the logic flow 2100 provides a high-level overview of operations to receive identifying data from body-carried devices via light transmissions and to employ that identifying data.

At 2110, a processor component of a transceiver device (e.g., the processor component 350 of the transceiver device 300) operates a camera of the transceiver device 300 (e.g., the camera 310) to recurringly capture frames of images of the field of view of the camera. As previously discussed, the camera may be operated to capture images at a rate typical of video cameras.

At 2120, the processor component analyzes sets of consecutively captured ones of the frames to identify light sources that are present throughout a great enough proportion of the frames to be possible light transmissions from body-carried devices. At 2130, the processor component employs a visual analysis of the set of frames to effectively demodulate the possible light transmissions. At 2140, the processor component analyzes characteristics of the possible light transmissions to determine whether they have one or more expected characteristics, including and not limited to, an expected bitrate, an expected pattern of bits in a header or other portion of the content, an expected error checking code, etc.

At 2150, the processor component retrieves ID data from the contents of whichever ones of the possible light transmissions were confirmed to be light transmissions from body-carried devices. As previously discussed, the ID data may include identifying information unique to the body-carried device that transmits it. However, in other embodiments, the identifying information may be unique to a person, an organization or an account associated with body-carried device.

At 2160, the processor component correlates locations in the camera's field of view of the light sources confirmed to be light transmissions from body-carried devices to locations of those body-carried devices in the venue. Alternatively or additionally, at 2170, the processor component may correlate particular body-carried devices to particular persons by correlating identifying data received in the light transmissions from the body-carried devices to identifying information about those persons. As previously discussed, such correlation may entail the use of data providing mappings of such correlations either received from other devices or generated through manual operation of a user interface provided by the processor component.

At 2180, the processor component employs identifying information of ID data received in a light transmission from a specific body-carried device in the portion of the venue in the field of view of the camera to direct a wireless transmission specifically to that specific body-carried device. As has been discussed, the selection of the specific body-carried device as one to which to direct a wireless transmission may be based on a correlation of location in the field of view to a location in the venue, or may be based on a correlation of its identifying information to the identifying information of a specific person. As also previously discussed, such wireless transmissions may be so directed by using the identifying information of a particular body-carried device as an identifier included in the wireless transmission, to select a RF channel for the wireless transmission, to encrypt or digitally sign the contents of the wireless transmission, etc.

Figure 10:
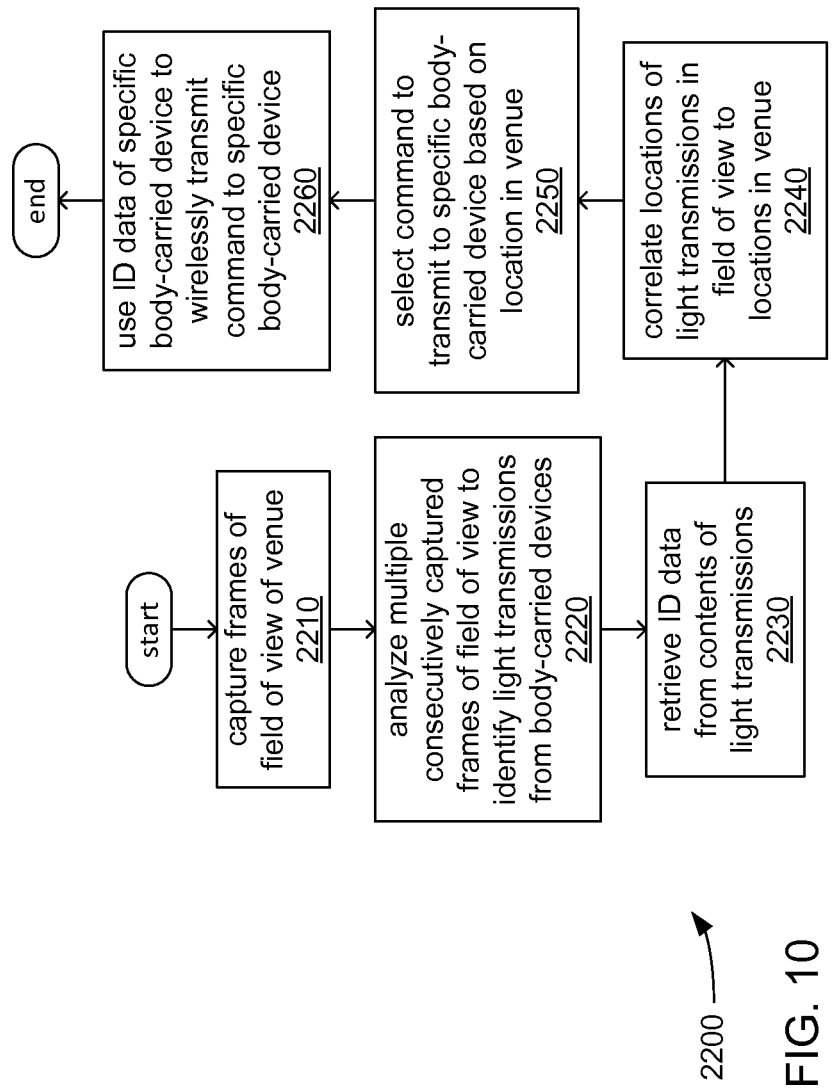

FIG. 10 illustrates an embodiment of a logic flow 2200. The logic flow 2200 may be representative of some or all of the operations executed by one or more embodiments described herein. More specifically, the logic flow 2200 may illustrate operations performed by at least the processor component 350 in executing at least the control routine 340, and/or performed by other component(s) of at least one of the transceiver devices 300. In particular, the logic flow 2200 provides a high-level overview of operations to select and wirelessly transmit a command to a body-carried device in a venue based on its location within the venue.

At 2210, a processor component of a transceiver device (e.g., the processor component 350 of the transceiver device 300) operates a camera of the transceiver device 300 (e.g., the camera 310) to recurringly capture frames of images of the field of view of the camera. As previously discussed, the camera may be operated to capture images at a rate typical of video cameras.

At 2220, the processor component analyzes sets of consecutively captured ones of the frames using various techniques to identify light transmissions from body-carried devices that have been captured in those consecutive frames. At 2230, the processor component retrieves ID data from the contents of those light transmissions from body-carried devices.

At 2240, the processor component correlates locations in the camera's field of view of the light sources confirmed to be light transmissions from body-carried devices to locations of those body-carried devices in the venue. As previously discussed, the use of one or more cameras to cover a venue enables both parallel reception of multiple light transmissions from multiple body-carried devices and a determination of the location of each of those body-carried devices (and of the persons carrying them) within the venue simply by correlating locations in the field(s) of view at which those transmissions may appear as light sources to locations within the venue.

At 2250, the processor component selects a command to wirelessly transmit to a specific one of the body-carried devices from which one or more light transmissions conveying its ID data have been received based on the location of that specific body-carried device as derived from correlation of its location in a field of view of a camera that received its light transmissions. As previously discussed, the selection of the specific body-carried device as a recipient of a wireless transmission conveying the command may be made automatically by the processor component 550 in response to a situation associated with that location of the venue having arisen. Again, an example may be the development of a hazardous condition at that location. However, another example may be the determination that the specific body-carried device is to be commanded to illuminate a light emitting component thereof with a specific color as part of the specific body-carried device being used as a "pixel" of a visual display incorporating multiple body-carried devices. At 2260, the processor component employs identifying information of ID data received in a light transmission from that specific body-carried device to direct the wireless transmission to that specific body-carried device.

Figure 11:
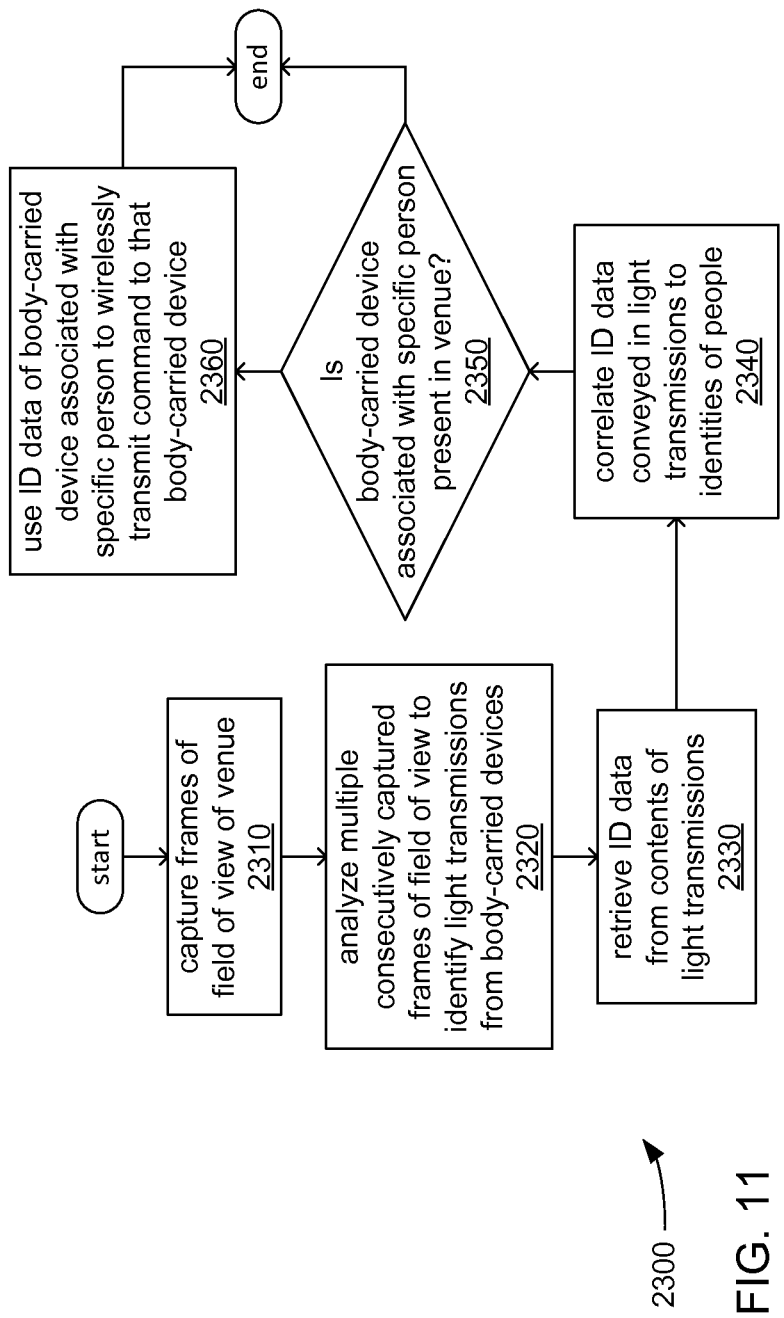

FIG. 11 illustrates an embodiment of a logic flow 2300. The logic flow 2300 may be representative of some or all of the operations executed by one or more embodiments described herein. More specifically, the logic flow 2300 may illustrate operations performed by at least the processor component 350 in executing at least the control routine 340, and/or performed by other component(s) of at least one of the transceiver devices 300. In particular, the logic flow 2300 provides a high-level overview of operations to select and wirelessly transmit a command to a body-carried device in a venue based on its association with a particular person as correlated via identifying data.

At 2310, a processor component of a transceiver device (e.g., the processor component 350 of the transceiver device 300) operates a camera of the transceiver device 300 (e.g., the camera 310) to recurringly capture frames of images of the field of view of the camera. At 2320, the processor component analyzes sets of consecutively captured ones of the frames using various techniques to identify light transmissions from body-carried devices that have been captured in those consecutive frames. At 2330, the processor component retrieves ID data from the contents of those light transmissions from body-carried devices.

At 2340, the processor component correlates particular body-carried devices to particular persons by correlating identifying data received in the light transmissions from the body-carried devices to identifying information about those persons. As previously discussed, at least some body-carried devices may be registered to particular persons or organizations of people such that a record of such associations of body-carried devices to people may be maintained by one or more servers (e.g., one or more of the servers 700). Thus, the processor component may be provided with device correlation data that includes a mapping of associations of persons to body-carried devices that the processor component may employ in correlating particular body-carried devices to particular people.

At 2350, the processor component selects a command to wirelessly transmit to a specific one of the body-carried devices from which one or more light transmissions conveying its ID data have been received based on it having been correlated to a specific person through such mapping information. As previously discussed, the selection of the specific body-carried device as a recipient of a wireless transmission conveying the command may be made automatically by the processor component 550 in response to having an operation associated with that specific person to command the specific body-carried device to perform. Again, an example may be the need to provide a message to that specific person by commanding the specific body-carried device to present that message to that specific person. At 2360, the processor component employs identifying information of ID data received in a light transmission from that specific body-carried device to direct the wireless transmission to that specific body-carried device.

Figure 12:
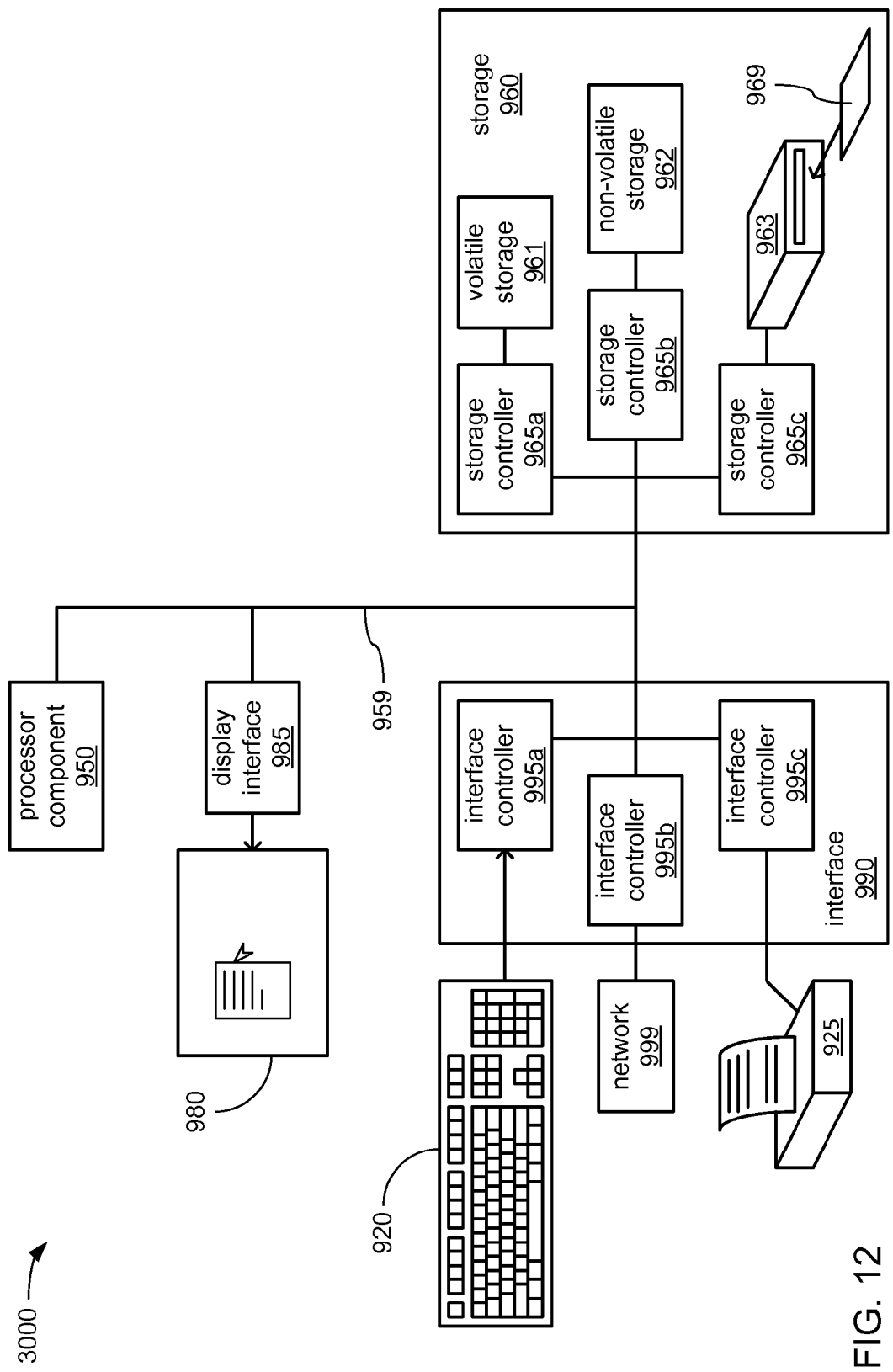
FIG. 12 illustrates a processing architecture according to an embodiment.

FIG. 12 illustrates an embodiment of an exemplary processing architecture 3000 suitable for implementing various embodiments as previously described. More specifically, the processing architecture 3000 (or variants thereof) may be implemented as part of one or more of the computing devices 400, 500 or 700, and/or as part of one or both of the tag devices 100 or 200. It should be noted that components of the processing architecture 3000 are given reference numbers in which the last two digits correspond to the last two digits of reference numbers of at least some of the components earlier depicted and described as part of the computing devices 100, 300, 500 and 700, as well as the controller 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 450 and 550, and may correspond to controllers 150 and 250) may include any of a wide variety of commercially available processors, employing any of a wide variety of technologies and implemented with one or more cores physically combined in any of a number of ways.

As previously discussed, the storage 960 (corresponding to the storages 160, 560, 660 and 760) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interfaces 190, 290, 490 or 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). More specifically, the interface controller 995b may incorporate one or more radio frequency (RF) transceivers and/or may be coupled to one or more antennae 991 (which may be incorporated into a portion of the interface 990) to exchange RF wireless signals with antenna(e) of one or more other devices as part of wireless communications on the depicted network 999. The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus to communicate via light transmissions includes a processor component; an analysis component for execution by the processor component to analyze a set of consecutively captured frames of a portion of a venue to determine whether a light source present in at least a predetermined number of the consecutively captured frames is a light transmission from a body-carried device located within the portion of the venue, and to demodulate the light transmission to retrieve an identification (ID) data associated with the body-carried device from the light transmission; and a communications component for execution by the processor component to employ the ID data to wirelessly transmit a command to the body-carried device.

In Example 2, which includes the subject matter of Example 1, the apparatus may include a capture component to operate a camera to consecutively capture a set of frames of the portion of the venue as the set of consecutively captured frames.

In Example 3, which includes the subject matter of any of Examples 1-2, the apparatus may include the camera, the camera positioned to place the portion of the venue in a field of view of the camera.

In Example 4, which includes the subject matter of any of Examples 1-3, the communications component may include the ID data with the command wirelessly transmitted to the body-carried device.

In Example 5, which includes the subject matter of any of Examples 1-4, the apparatus may include an antenna, and an interface coupling the antenna to the processor component to wirelessly transmit the command to the body-carried device in a radio frequency (RF) transmission.

In Example 6, which includes the subject matter of any of Examples 1-5, the communications component may select a frequency to use to wirelessly transmit the command to the body-carried device based on the ID data.

In Example 7, which includes the subject matter of any of Examples 1-6, the apparatus may include a light emitting component and an interface coupling the light emitting component to the processor component to transmit the command to the body-carried device in another light transmission.

In Example 8, which includes the subject matter of any of Examples 1-7, the apparatus may include a view correlation component for execution by the processor component to correlate a location of the light source in a field of view of the set of captured frames to a location within the portion of the venue to determine a location of the body-carried device within the portion of the venue.

In Example 9, which includes the subject matter of any of Examples 1-8, the view correlation component may employ view correlation data comprising a mapping of locations in the field of view to locations within the portion of the venue to correlate the location of the light source in the field of view to the location of the body-carried device within the portion of the venue, and the apparatus may include a user interface (UI) component for execution by the processor component to operate at least one of controls or a display to enable generation of the correlation data.

In Example 10, which includes the subject matter of any of Examples 1-9, the apparatus may include a selection component for execution by the processor component to select the command to wirelessly transmit to the body-carried device based on the location of the body-carried device within the portion of the venue.

In Example 11, which includes the subject matter of any of Examples 1-10, the command may include at least one of a command to operate a component of the body-carried device to present a warning of a condition associated with the location within the portion of the venue or a command to illuminate a light emitting component of the body-carried device with a color selected based on the location within the portion of the venue.

In Example 12, which includes the subject matter of any of Examples 1-11, the analysis component may retrieve data from the light transmission indicating a measure taken by a sensor of the body-carried device of a characteristic of at least one of the portion of the venue or a body of a person carrying the body-carried device.

In Example 13, which includes the subject matter of any of Examples 1-12, the characteristic may include at least one of temperature, humidity, noise level, acceleration, heart rate, perspiration level or a level of a hazardous gas.

In Example 14, which includes the subject matter of any of Examples 1-13, the view correlation component may store an indication of the location of the body-carried device within the portion of the venue as part of a detection record, and to discard a duplicate indication of the location of the body-carried device within the portion of the venue from the detection record, the duplicate indication derived from a location of the body-carried device in another field of view that overlaps the field of view.

In Example 15, which includes the subject matter of any of Examples 1-14, the apparatus may include a device correlation component for execution by the processor component to correlate the ID data to an identity of a person to associate the person with the body-carried device.

In Example 16, which includes the subject matter of any of Examples 1-15, the device correlation component may employ device correlation data comprising a mapping of identifying information for multiple devices to identifying information for multiple persons to associate the person with the body-carried device, and the apparatus may included an interface coupling the processor component to a network, the communications component to obtain the device correlation data via the network.

In Example 17, which includes the subject matter of any of Examples 1-16, the apparatus may include a selection component for execution by the processor component to select the body-carried device to wirelessly transmit the command to based on the association of the body-carried device with the person.

In Example 18, which includes the subject matter of any of Examples 1-17, the command may include a command to operate a component of the body-carried device to present a message directed to the person.

In Example 19, which includes the subject matter of any of Examples 1-18, the device correlation component may store an indication of the association of the body-carried device with the person as part of a detection record, and the apparatus may include a view correlation component for execution by the processor component to correlate a location of the light source in a field of view of the set of captured frames to a location within the portion of the venue to determine the location of the body-carried device within the portion of the venue and to store an indication of the location of the body-carried device within the portion of the venue as part of the detection record.

In Example 20, an apparatus to communicate via light transmissions includes an antenna; a processor component; an interface coupling the antenna to the processor component; an analysis component for execution by the processor component to analyze a set of consecutively captured frames of a portion of a venue to determine whether a plurality of light sources present in at least a predetermined number of the consecutively captured frames are a plurality of light transmissions from a plurality of body-carried devices located within the venue, and to demodulate the plurality of light transmissions to retrieve identification (ID) data associated with each body-carried device of the plurality of body-carried device from the light transmissions, the ID data associated with each body-carried device comprising an identifier unique to each body-carried device; and a communications component for execution by the processor component to operate the interface to employ the ID data of each body-carried device to serially transmit a command to each of the body-carried devices.

In Example 21, which includes the subject matter of Example 20, the apparatus may include a camera positioned to place the portion of the venue in a field of view of the camera, and a capture component to operate the camera to consecutively capture a set of frames of the portion of the venue as the set of consecutively captured frames to receive the plurality of light transmissions in parallel.

In Example 22, which includes the subject matter of any of Examples 20-21, the communications component to include the ID data associated with the at least one body-carried device with the command wirelessly transmitted to the at least one body-carried device.

In Example 23, which includes the subject matter of any of Examples 20-22, the communications component to select a radio frequency to use to wirelessly transmit the command to the at least one body-carried device based on the ID data.

In Example 24, which includes the subject matter of any of Examples 20-23, the apparatus may include a view correlation component for execution by the processor component to correlate locations of the plurality of light sources in a field of view of the set of captured frames to locations within the portion of the venue to determine locations of each body-carried device of the plurality of body-carried devices within the portion of the venue.

In Example 25, which includes the subject matter of any of Examples 20-24, the apparatus may include a selection component for execution by the processor component to select a command to wirelessly transmit to each body-carried device of the plurality of body carried devices in multiple serial transmissions based on the location of each body-carried device within the portion of the venue.

In Example 26, which includes the subject matter of any of Examples 20-25, the command transmitted to each body-carried device of the plurality of body-carried devices may include one of a command to illuminate a light emitting component of a body-carried device of the plurality of body-carried devices with a first color, to illuminate a light emitting component of a body-carried device of the plurality of body-carried devices with a second color, or to not illuminate a light emitting component of a body-carried device of the plurality of body-carried devices.

In Example 27, a computing-implemented method for communicating via light transmissions includes analyzing a set of consecutively captured frames of a portion of a venue to determine whether a light source present in at least a predetermined number of the consecutively captured frames is a light transmission from a body-carried device located within the portion of the venue, demodulating the light transmission to retrieve an identification (ID) data associated with the body-carried device from the light transmission, and employing the ID data to wirelessly transmit a command to the body-carried device.

In Example 28, which includes the subject matter of Example 27, the method may include operating a camera to consecutively capture a set of frames of the portion of the venue as the set of consecutively captured frames, the camera positioned to place the portion of the venue in a field of view of the camera.

In Example 29, which includes the subject matter of any of Examples 27-28, the method may include including the ID data with the command wirelessly transmitted to the body-carried device.

In Example 30, which includes the subject matter of any of Examples 27-29, the method may include selecting a radio frequency for wirelessly transmitting the command to the body-carried device based on the ID data.

In Example 31, which includes the subject matter of any of Examples 27-30, the method may include wirelessly transmitting the command to the body-carried device in another light transmission.

In Example 32, which includes the subject matter of any of Examples 27-31, the method may include comprising correlating a location of the light source in a field of view of the set of captured frames to a location within the portion of the venue to determine a location of the body-carried device within the portion of the venue.

In Example 33, which includes the subject matter of any of Examples 27-32, the method may include employing view correlation data comprising a mapping of locations in the field of view to locations within the portion of the venue to correlate the location of the light source in the field of view to the location of the body-carried device within the portion of the venue.

In Example 34, which includes the subject matter of any of Examples 27-33, the method may include providing a user interface to enable provision of the mapping to generate the correlation data.

In Example 35, which includes the subject matter of any of Examples 27-34, the method may include selecting the command to wirelessly transmit to the body-carried device based on the location of the body-carried device within the portion of the venue.

In Example 36, which includes the subject matter of any of Examples 27-35, the command may include at least one of a command to operate a component of the body-carried device to present a warning of a condition associated with the location within the portion of the venue or a command to illuminate a light emitting component of the body-carried device with a color selected based on the location within the portion of the venue.

In Example 37, which includes the subject matter of any of Examples 27-36, the method may include retrieving data from the light transmission indicating a measure taken by a sensor of the body-carried device of a characteristic of at least one of the portion of the venue or a body of a person carrying the body-carried device.

In Example 38, which includes the subject matter of any of Examples 27-37, the characteristic may include at least one of temperature, humidity, noise level, acceleration, heart rate, perspiration level or a level of a hazardous gas.

In Example 39, which includes the subject matter of any of Examples 27-38, the method may include storing an indication of the location of the body-carried device within the portion of the venue as part of a detection record; and discarding a duplicate indication of the location of the body-carried device within the portion of the venue from the detection record, the duplicate indication derived from a location of the body-carried device in another field of view that overlaps the field of view.

In Example 40, which includes the subject matter of any of Examples 27-39, the method may include correlating the ID data to an identity of a person to associate the person with the body-carried device.

In Example 41, which includes the subject matter of any of Examples 27-40, the method may include employing device correlation data comprising a mapping of identifying information for multiple devices to identifying information for multiple persons to associate the person with the body-carried device.

In Example 42, which includes the subject matter of any of Examples 27-41, the method may include retrieving the device correlation data via a network.

In Example 43, which includes the subject matter of any of Examples 27-42, the method may include selecting the body-carried device to wirelessly transmit the command to based on the association of the body-carried device with the person.

In Example 44, which includes the subject matter of any of Examples 27-43, the command may include a command to operate a component of the body-carried device to present a message directed to the person.

In Example 45, which includes the subject matter of any of Examples 27-44, the method may include storing an indication of the association of the body-carried device with the person as part of a detection record, correlating a location of the light source in a field of view of the set of captured frames to a location within the portion of the venue to determine the location of the body-carried device within the portion of the venue, and storing an indication of the location of the body-carried device within the portion of the venue as part of the detection record.

In Example 46, which includes the subject matter of any of Examples 27-45, the method may include analyzing the set of consecutively captured frames to determine whether a plurality of light sources present in at least the predetermined number of the consecutively captured frames are a plurality of light transmissions from a plurality of body-carried devices located within the venue, and to demodulate the plurality of light transmissions to retrieve ID data associated with each body-carried device of the plurality of body-carried device from the light transmissions, the plurality of body-carried devices comprising the body-carried device and the ID data associated with each body-carried device comprising an identifier unique to each body-carried device; and selecting a command to wirelessly transmit to each body-carried device of the plurality of body carried devices in multiple serial transmissions based on the location of each body-carried device within the portion of the venue.

In Example 47, at least one machine-readable storage medium includes instructions that when executed by a computing device, cause the computing device to analyze a set of consecutively captured frames of a portion of a venue to determine whether a light source present in at least a predetermined number of the consecutively captured frames is a light transmission from a body-carried device located within the portion of the venue, demodulate the light transmission to retrieve an identification (ID) data associated with the body-carried device from the light transmission, and employ the ID data to wirelessly transmit a command to the body-carried device.

In Example 48, which includes the subject matter of Example 47, the computing device may be caused to operate a camera to consecutively capture a set of frames of the portion of the venue as the set of consecutively captured frames, the camera positioned to place the portion of the venue in a field of view of the camera.

In Example 49, which includes the subject matter of any of Examples 47-48, the computing device may be caused to include the ID data with the command wirelessly transmitted to the body-carried device.

In Example 50, which includes the subject matter of any of Examples 47-49, the computing device may be caused to select a radio frequency for wirelessly transmitting the command to the body-carried device based on the ID data.

In Example 51, which includes the subject matter of any of Examples 47-50, the computing device may be caused to wirelessly transmit the command to the body-carried device in another light transmission.

In Example 52, which includes the subject matter of any of Examples 47-51, the computing device may be caused to correlate a location of the light source in a field of view of the set of captured frames to a location within the portion of the venue to determine a location of the body-carried device within the portion of the venue.

In Example 53, which includes the subject matter of any of Examples 47-52, the computing device may be caused to employ view correlation data comprising a mapping of locations in the field of view to locations within the portion of the venue to correlate the location of the light source in the field of view to the location of the body-carried device within the portion of the venue.

In Example 54, which includes the subject matter of any of Examples 47-53, the computing device may be caused to operate at least one of controls of the computing device or a display of the computing device to provide a user interface to enable provision of the mapping to generate the correlation data.

In Example 55, which includes the subject matter of any of Examples 47-54, the computing device may be caused to select the command to wirelessly transmit to the body-carried device based on the location of the body-carried device within the portion of the venue.

In Example 56, which includes the subject matter of any of Examples 47-54, the command may include at least one of a command to operate a component of the body-carried device to present a warning of a condition associated with the location within the portion of the venue or a command to illuminate a light emitting component of the body-carried device with a color selected based on the location within the portion of the venue.

In Example 57, which includes the subject matter of any of Examples 47-56, the computing device may be caused to retrieve data from the light transmission indicating a measure taken by a sensor of the body-carried device of a characteristic of at least one of the portion of the venue or a body of a person carrying the body-carried device.

In Example 58, which includes the subject matter of any of Examples 47-57, the characteristic may include at least one of temperature, humidity, noise level, acceleration, heart rate, perspiration level or a level of a hazardous gas.

In Example 59, which includes the subject matter of any of Examples 47-58, the computing device may be caused to store an indication of the location of the body-carried device within the portion of the venue as part of a detection record; and discard a duplicate indication of the location of the body-carried device within the portion of the venue from the detection record, the duplicate indication derived from a location of the body-carried device in another field of view that overlaps the field of view.

In Example 60, which includes the subject matter of any of Examples 47-59, the computing device may be caused to correlate the ID data to an identity of a person to associate the person with the body-carried device.

In Example 61, which includes the subject matter of any of Examples 47-60, the computing device may be caused to employ device correlation data comprising a mapping of identifying information for multiple devices to identifying information for multiple persons to associate the person with the body-carried device.

In Example 62, which includes the subject matter of any of Examples 47-61, the computing device may be caused to retrieve the device correlation data via a network.

In Example 63, which includes the subject matter of any of Examples 47-62, the computing device may be caused to select the body-carried device to wirelessly transmit the command to based on the association of the body-carried device with the person.

In Example 64, which includes the subject matter of any of Examples 47-63, the command may include a command to operate a component of the body-carried device to present a message directed to the person.

In Example 65, which includes the subject matter of any of Examples 47-64, the computing device may be caused to store an indication of the association of the body-carried device with the person as part of a detection record, correlate a location of the light source in a field of view of the set of captured frames to a location within the portion of the venue to determine the location of the body-carried device within the portion of the venue, and store an indication of the location of the body-carried device within the portion of the venue as part of the detection record.

In Example 66, which includes the subject matter of any of Examples 47-65, the computing device may be caused to analyze the set of consecutively captured frames to determine whether a plurality of light sources present in at least the predetermined number of the consecutively captured frames are a plurality of light transmissions from a plurality of body-carried devices located within the venue, and to demodulate the plurality of light transmissions to retrieve ID data associated with each body-carried device of the plurality of body-carried device from the light transmissions, the plurality of body-carried devices comprising the body-carried device and the ID data associated with each body-carried device comprising an identifier unique to each body-carried device; and select a command to wirelessly transmit to each body-carried device of the plurality of body carried devices in multiple serial transmissions based on the location of each body-carried device within the portion of the venue.

In Example 67, at least one machine-readable storage medium may include instructions that when executed by a computing device, cause the computing device to perform any of the above.

In Example 68, an apparatus to communicate via light transmissions may include means for performing any of the above.

The invention claimed is:

1. An apparatus to communicate via light transmissions comprising:
   a processor; and
   logic, at least partially implemented by the processor, the logic to:
      analyze a set of consecutively captured frames of a portion of a venue to determine whether a light source present in at least a predetermined number of the set of consecutively captured frames is a light transmission from a body-carried device located within the portion of the venue;
      demodulate the light transmission to retrieve an identification (ID) data associated with the body-carried device from the light transmission;
      map a location of the light source in a field of view of the set of consecutively captured frames to a location within the portion of the venue to correlate the location of the light source in the field of view to a location of the body-carried device within the portion of the venue;
      select a command to wirelessly transmit to the body-carried device based on the location of the body-carried device within the portion of the venue; and
      employ the ID data to wirelessly transmit the command to the body-carried device.

2. The apparatus of claim 1, the logic to operate a camera to consecutively capture a set of frames of the portion of the venue as the set of consecutively captured frames.

3. The apparatus of claim 1, comprising:
   an antenna; and
   an interface coupling the antenna to the processor to wirelessly transmit the command to the body-carried device in a radio frequency (RF) transmission.

4. The apparatus of claim 1, the logic to correlate the ID data to an identity of a person to associate the person with the body-carried device.

5. The apparatus of claim 4, the logic to select the body-carried device to wirelessly transmit the command based on the association of the body-carried device with the person.

6. An apparatus to communicate via light transmissions comprising:
   an antenna;
   a processor;
   an interface coupling the antenna to the processor; and
   logic, at least partially implemented by the processor, the logic to:
      analyze a set of consecutively captured frames of a portion of a venue to determine whether a plurality of light sources present in at least a predetermined number of the set of consecutively captured frames are a plurality of light transmissions from a plurality of body-carried devices located within the venue,
      demodulate the plurality of light transmissions to retrieve identification (ID) data associated with each body-carried device of the plurality of body-carded devices from the plurality of light transmissions, the ID data associated with the each body-carried device comprising an identifier unique to the each body-carried device,
      map locations of the plurality of light sources in a field of view of the set of consecutively captured frames to correlate the locations of the plurality of light sources in the field of view within the portion of the venue to locations of the each body- carried device of the plurality of body carrier devices within the portion of the venue;
      select commands to wirelessly transmit to the each body-carried device of the plurality of body carried devices in multiple serial transmissions based on the locations of the each body-carried device within the portion of the venue, and
      employ the ID data of the each body-carried device to serially transmit the commands to the each of the body-carried devices.

7. The apparatus of claim 6, comprising:
   a camera positioned to place the portion of the venue in the field of view of the camera; and the logic operate the camera to consecutively capture a set of frames of the portion of the venue as the set of consecutively captured frames to receive the plurality of light transmissions in parallel.

8. The apparatus of claim 6, each of the commands selected to wirelessly transmit to the each body-carried device of the plurality of body-carried devices to either illuminate each light emitting component of the each body-carried device with any one of a selection of colors, or not illuminate the each light emitting component of the each body-carried device.

9. A computer-implemented method for communicating via light transmissions comprising:
   analyzing a set of consecutively captured frames of a portion of a venue to determine whether a light source present in at least a predetermined number of the set of consecutively captured frames is a light transmission from a body-carried device located within the portion of the venue;
   demodulating the light transmission to retrieve an identification (ID) data associated with the body-carried device from the light transmission;
   mapping a location of the light source in a field of view of the set of consecutively captured frames to a location within the portion of the venue correlating the location of the light source in the field of view to a location of the body-carried device within the portion of the venue;
   selecting a command to wirelessly transmit to the body-carried device based on the location of the body-carried device within the portion of the venue; and
   employing the ID data to wirelessly transmit the command to the body-carried device.

10. The computer-implemented method of claim 9, comprising operating a camera to consecutively capture a set of frames of the portion of the venue as the set of consecutively captured frames, the camera positioned to place the portion of the venue in the field of view of the camera.

11. The computer-implemented method of claim 9, comprising retrieving data from the light transmission indicating a measure taken by a sensor of the body-carried device of a characteristic of at least one of the portion of the venue or a body of a person carrying the body-carried device.

12. The computer-implemented method of claim 11, the characteristic comprising at least one of temperature, humidity, noise level, acceleration, heart rate, perspiration level or a level of a hazardous gas.

13. The computer-implemented method of claim 9, comprising:
   storing an indication of the location of the body-carried device within the portion of the venue as part of a detection record; and
   discarding a duplicate indication of the location of the body-carried device within the portion of the venue from the detection record, the duplicate indication derived from a location of the body-carried device in another field of view that overlaps the field of view.

14. The computer-implemented method of claim 9, comprising correlating the ID data to an identity of a person to associate the person with the body-carried device.

15. At least one non-transitory machine-readable storage medium comprising instructions that when executed by a computing device, cause the computing device to:
   analyze a set of consecutively captured frames of a portion of a venue to determine whether a light source present in at least a predetermined number of the set of consecutively captured frames is a light transmission from a body-carried device located within the portion of the venue;
   demodulate the light transmission to retrieve an identification (ID) data associated with the body-carried device from the light transmission;
   map a location of the light source in a field of view of the set of consecutively captured frames to a location within the portion of the venue to correlate the location of the light source in the field of view to a location of the body-carried device within the portion of the venue;
   select a command to wirelessly transmit to the body-carried device based on the location of the body-carried device within the portion of the venue; and
   employ the ID data to wirelessly transmit the command to the body-carried device.

16. The at least one non-transitory machine-readable storage medium of claim 15, the computing device caused to correlate the ID data to an identity of a person to associate the person with the body-carried device.

17. The at least one non-transitory machine-readable storage medium of claim 16, the computing device caused to select the body-carried device to wirelessly transmit the command based on the association of the body-carried device with the person.

18. The at least one non-transitory machine-readable storage medium of claim 17, the command further comprising a command to operate a component of the body-carried device to present a message directed to the person.

19. The at least one non-transitory machine-readable storage medium of claim 16, the computing device caused to:
   store an indication of the association of the body-carried device with the person as part of a detection record; and
   store an indication of the location of the body-carried device within the portion of the venue as part of the detection record.

* * * * *

UNITED STATES PATENT AND TRADEMARK OFFICE
CERTIFICATE OF CORRECTION

PATENT NO. : 10,009,099 B2  
APPLICATION NO. : 14/229892  
DATED : June 26, 2018  
INVENTOR(S) : Mathys C. Walma, Richard D. Roberts and Bradley A. Jackson Page 1 of 1

It is certified that error appears in the above-identified patent and that said Letters Patent is hereby corrected as shown below:

In the Claims

Column 36, Line 45, replace "body-carded" with -- body-carried --.

Column 36, Line 54, replace "body- carried" with -- body-carried --.

Column 36, Line 55, replace "body carrier" with -- body-carried --.

Column 38, Line 14, replace "alight" with -- a light --.

Signed and Sealed this  
Fifteenth Day of October, 2019

Andrei Iancu  
*Director of the United States Patent and Trademark Office*